United States Patent [19]
Takatsuka et al.

[11] Patent Number: 5,953,178
[45] Date of Patent: Sep. 14, 1999

[54] MAGNETIC DISK APPARATUS

[75] Inventors: Akio Takatsuka, Hiratsuka; Hideaki Amano, Odawara; Katsuhiro Tsuneta, Odawara; Toshiaki Tsuyoshi, Odawara; Tetsuji Kameoka, Odawara; Haruhiko Hosokawa, Odawara; Takashi Yamaguchi, Tsuchiura; Kazuyoshi Hanada, Hadano; Satoru Yamaura, Odawara; Toshio Matsushita, Kanagawa-ken; Toshihisa Okazaki, Odawara, all of Japan

[73] Assignee: Hitachi, Ltd., Tokyo, Japan

[21] Appl. No.: 08/977,942

[22] Filed: Nov. 24, 1997

Related U.S. Application Data

[62] Division of application No. 08/556,596, Nov. 13, 1995, abandoned.

[30] Foreign Application Priority Data

Nov. 16, 1994 [JP] Japan .................................. 6-281677
Jan. 12, 1995 [JP] Japan .................................. 7-003087

[51] Int. Cl.⁶ .................................................. G11B 5/596
[52] U.S. Cl. ...................................... 360/77.02; 360/77.07; 360/78.04
[58] Field of Search .................................. 360/75, 77.01, 360/77.02, 77.08, 77.11, 77.06, 77.07, 78.01, 78.04

[56] References Cited

U.S. PATENT DOCUMENTS 5,587,850  12/1996  Ton-that ........................... 360/77.08

FOREIGN PATENT DOCUMENTS

0259952A1   3/1988  European Pat. Off. .
0325365A2   7/1989  European Pat. Off. .
590676A2    4/1994  European Pat. Off. .
590676A3    4/1994  European Pat. Off. .
3-160675    7/1991  Japan .
4-137278    5/1992  Japan .
6-28775     2/1994  Japan .
6-60573     3/1994  Japan .
6-243605    9/1994  Japan .
6-251517    9/1994  Japan .

OTHER PUBLICATIONS

"Use of Variable Track Pitch Allowed By Performance Variation", IBM Technical Disclosure Bulletin, vol. 33, No. 12, May 1991, p. 131.
Patent Abstract of Japan, 06314479, Nov. 8, 1994, Shinichi Magnetic Disk Device.
Patent Abstract of Japan, vol. 12 No. 388, Jun. 1, 1988, Tadashi Magnetic Disk Reproducing Device.
Patent Abstract of Japan vol. 15 No. 471 Sep. 4, 1991, Takashi et al. Servo Signal Writing–in Method & Servo Disk Medium in Magnetic Disk Device.
Patent Abstract of Japan vol. 14 No. 332, Apr. 24, 1990, Tomio Recording Method.
Patent Abstract of Japan vol. 14 No. 301, Apr. 4, 1990, Hiroshi et al. Mohitract Magnetic Head and Method for Controlling Tracking by Such Head.

*Primary Examiner*—Andrew L. Sniezek
*Attorney, Agent, or Firm*—Fay,Sharpe,Beall,Fagan, Minnich & McKee

[57] ABSTRACT

A magnetic disk apparatus includes a dual head equipped with an MR head for reading data and an inductive head for writing the data. One ID portion and one servo pattern are disposed in one sector and an unequal track pitch is formed. The ID portion is formed at the center of a radius of two positions to which the MR head is positioned at the time of reading the data and writing the data, respectively.

10 Claims, 11 Drawing Sheets

DUAL HEAD STRUCTURE

ID PORTION WRITE RADIUS POSITION

HEAD YAW ANGLE

NOMINAL SHIFT QUANTITY OF R/W GAP

MAGNETIC DISK APPARATUS

This is a divisional application of Ser. No. 08/556,596, filed Nov. 13, 1995 now abandoned.

BACKGROUND OF THE INVENTION

The present invention relates to a magnetic disk apparatus, and more particularly to a magnetic disk apparatus equipped with an improved dual head, a magnetic disk with track pitch and ID information and using a rotary actuator.

The term "dual head" herein used means a magnetic head provided with a slider which includes at least two magnetic elements for reading or writing electromagnetic signals (data).

DESCRIPTION OF THE RELATED ART

Concentrical magnetic recording regions formed electromagnetically by a magnetic head on a magnetic disk medium are referred to as "magnetic tracks" or merely as "tracks". A plurality of units of recording regions referred to as "sectors" are arranged in a circumferential direction and constitute such tracks.

On the other hand, a plurality of tracks are concentrically disposed in a radial direction of the disk medium and form one or a plurality of data zones as information storage regions. The distance between the adjacent track centers in the radial direction is referred to as "track pitch". A magnetic head is mounted to a slider, and the slider is moved by an actuator from a certain track to another on the disk medium. This operation is referred to as a "seek" operation.

As the slider having the magnetic head mounted thereto relatively floats on the disk while keeping a small gap, the magnetic head electromagnetically reads or writes signal from or to a magnetic film on the disk medium.

Generally, one ID portion is disposed in one sector so as to make it easy to position the magnetic head during the seek operation, and information of the sector to which the ID portion belongs and other information are stored in this ID portion. One or a plurality of ID information may be provided to one sector. It is realistic to dispose at least one ID information, inclusive of information at which position on the sector the ID portion is positioned, in one track. However, when information that generates the ID information from other information can be extracted, the ID information is not necessary.

A system which positions the magnetic head over the surface of the medium but does not particularly move it from the medium surface to a standby position at the start or stop of the rotation of the disk medium is referred to as a "contact-start-stop (CSS)".

Mention can be made of JP-A-4-137278, JP-A-6-28775 and JP-A-6-60573 as the prior art.

The technologies disclosed in these prior art references are directed to stably read out signals from the disk medium, to stably secure servo signals and to effectively utilize the disk medium by setting the track pitch to a large value on the inner circumferential side of the disk medium and to a small value on the outer circumferential side.

JP-B-3-160675 contemplates to improve a data read system and a servo system by disposing two kinds of servo information in one sector.

However, these prior art technologies do not take the ID information, the ID portion or an error rate into consideration. Here, the term "error rate" means a rate of data erroneously read out when written data are read out. The present invention takes the ID information, the ID portion or the error rate into consideration.

Whereas the information storage capacity required for a magnetic disk apparatus has been increasing, at the same time, a reduction of the size of the apparatus has been required. When the apparatus becomes compact, the diameter of the disk medium used for such an apparatus must be unavoidably smaller, so that high density recording is necessary for magnetic recording technique. To store greater quantities of information in a small disk medium, a magnetic reversion region (magnetization region) per unit area becomes smaller and due to electromagnetic induction, the signal reading technology based on the relative speed between the magnetization region and the gap of the magnetic head has substantially reached the limit.

To solve this problem, a magnetic reproduction technique using a magneto-resistivity effect has been examined. Because this technique uses an MR device for the magnetic head (hereinafter referred to as a "magnetic resistive head" or an "MR head"), it can secure a signal output which does not depend on the relative speed between the magnetic medium and the magnetic head. However, because the MR head is a read-only magnetic head, a conventional inductive head must be used in combination with the read head in practical magnetic disk apparatuses. The present invention is effective for dealing with a problem generated by utilization of the MR head.

The present invention relates also to a magnetic disk apparatus as a memory apparatuse for a computers. In the present invention, a head standby region for allowing the head to keep a standby position on the disk surface is disposed at the innermost circumferential position of the disk within a moving range of the head on the disk surface, and a head yaw angle is set in such a manner that when the head and the disk come into mutual contact at a position in the arbitrary radial position on the disk surface, a carriage always rotates towards the inner circumferential side by the direction of the frictional force. Alternatively, the head is disposed in such a manner that the head yaw angle always exists at an arbitrary head position in the radial direction on the disk surface, so that the carriage rotates towards the inner circumferential side. The disk apparatus of the invention includes a carriage fixing mechanism for temporarily fixing the head to a specific position on the disk surface. The fixing force of this carriage fixing mechanism is set to a greater value than the moving force of the carriage due to external impact or vibration. A magnetic member is disposed at a portion rotating with the carriage, and a magnet retract mechanism is provided so as to attract the magnetic member by utilizing a leaking magnetic flux of a magnet constituting a voice coil motor that swings the carriage. The head is disposed in such a manner that the head yaw angle attains a minimum angle at the innermost circumferential position within the moving range of the head on the disk surface.

Means for moving and fixing the head to the head standby region on the disk surface has been disclosed in JP-A-6-243605 (hereinafter called the "prior art reference A") and JP-A-6-251517 (hereinafter called the "prior art reference B").

SUMMARY OF THE INVENTION

It is an object of the present invention to provide a magnetic disk apparatus which uses a dual head capable of preventing the drop of the information recording density and improving an error rate at the time of reading the information.

It is another object of the present invention to provide a magnetic disk apparatus which can move and fix a head in a head standby region during shipment or stop of the operation of the apparatus, and can accomplish reduction of the size and the thickness of the apparatus, as well as providing reliability, lower power consumption, lower cost and higher information processing speed.

When high density magnetic recording is carried out by using the subject dual head, how a write head and a read head are mounted on the subject dual head and the deviation of the geometrical arrangement of their gaps (hereinafter called the "offset") are of importance.

In other words, in a magnetic disk apparatus using the dual head which is mounted to a rotary actuator, deterioration of the error rate of the ID portion resulting from this offset is unavoidable at the time of readout of the ID information when the ID portion is not written successively in the track direction, for the following reasons.

1) yaw angle of the magnetic head (to be later described) resulting from the rotation of the rotary actuator;
2) the difference of radii of the magneto-resistive head and the inductive head with respect to the center of rotation of a spindle.

Due to these factors, the head positioning radius at the time of data readout is different from that at the time of data write, and a steady offset occurs always when the ID portion is read or written.

Because this offset exists, the magnetic disk apparatus might erroneously read the ID information during the seek operation so that the error rate of the ID might deteriorate. Because this offset exists, the magnetic disk apparatus might have a read error when reading information of the most important ID portion among the information stored in the sector.

Once the ID information can be read, the exact information regarding the position of the magnetic head can be confirmed correctly for the subsequent data portion, so that the error rate is improved much more at the data portion than at the ID portion.

It is therefore important to read the ID information without error, and to accomplish this object, the error rate of the region storing the ID information must be limited to below a predetermined value.

Particularly in the case of a magnetic disk apparatus employing a so-called "1 sector/1 ID format" having one kind of ID information in one sector, the problem of the offset is remarkable.

Therefore, the present invention employs the following means.

(1) The track pitch is an unequal pitch such that the track pitch becomes coarse at the inner and outer circumferences of the disk medium and becomes dense at the center.

(2) The write radius position of the ID portion is written to an intermediate point between the positioning radius position of the MR head when the MR head reads out the data and the positioning radius position of the MR head when the inductive head writes the data.

(3) After the periphery of the write portion of the ID portion is erased in advance, the ID information is written.

(4) The track pitch is defined as an unequal track pitch. A fluctuation component in an actuator rotating angle corresponding to the track pitch is limited to not greater than 7%.

(5) A dual head having a core width satisfying better values than an error rate of the ID portion of $1 \times 10^{-6}$ and an error rate of the data portion of $1 \times 10^{-8}$. In other words, a head assembly has a nominal shift quantity for the MR head and the inductive head so that the difference between the positions of the MR head and the inductive head in the radial direction becomes zero (0) at the center of the disk medium (disc), and has a yaw angle such that the actuator always receives the rotating force in the inner circumferential direction at the time of CSS.

(6) The disk medium is divided into n (n: natural number) data zones, an equal pitch is used within the same zone and an unequal pitch is used between the zones.

The advantageous effects corresponding to the arrangements described above will be described in such a manner as to correspond to each of the arrangements.

(1) The deterioration of the error rates at the ID portion and data portion can be limited to the low rates with respect to the influences from the adjacent tracks and the influences of the noise of a track which is being read in such a manner as to correspond to the data recording density at each track position.

(2) Deterioration of the error rate at the time of read-out of the ID portion can be restricted.

(3) Since the periphery of the ID portion is erased prior to the write operation, the influences of the residual noise can be eliminated and the error rate of the ID portion can be improved.

(4) Since the change of the unequal track pitch is reduced to less than 7%, the change does not exert adverse influences on the seek moving distance change that occurs at the time of the seek operation of the head actuator, the fluctuation of the position detection gain, or the change of position detection linearity.

(5) The error rate of the ID portion can be set under the condition of the offset severest for the ID portion, and expansion of the detailed specification after reading of the ID portion becomes possible. By securing the inner circumferential CSS zone to the inner circumference, the torque for activating the motor against the frictional force between the slider of the magnetic head and the medium disk at the time of the start of the motor can be limited to a low torque.

In combination with the effect of the item (2), the offset quantity at the time of reading of the ID portion can be limited to $\frac{1}{2} \times \frac{1}{2} = \frac{1}{4}$ of the maximum value (P-P value) of the offset quantity in the radial direction.

(6) Processing loads such as the servo track processing time, the seek system track processing time and the data system track processing time can be reduced.

When the present invention is applied, it becomes possible to restrict the drop of format efficiency of the ID portion caused by the dual head and to improve the error rate of the ID portion by the unequal pitch.

The offset quantity at the time of reading the ID portion by the MR head can be reduced to half by setting the write radius position of the ID portion to the center between the positioning radius of the MR head when the MR head reads the data and the positioning radius of the MR head when the inductive head writes the data. Accordingly, the error rate of the ID portion can be improved.

The error rate of the ID portion can be improved by erasing the ID portion before data write.

If the error rate of the ID portion is limited to less than $1 \times 10^{-6}$, the error rate of the data portion becomes less than $1 \times 10^{-8}$. In consequence, the fundamental conditions for accomplishing various functions of the magnetic disk apparatus can be satisfied.

Because the fluctuation of the actuator rotating angle corresponding to the track pitch is limited to not greater than 7%, adverse influences of the signal output on the servo circuit can be eliminated.

The error rates of the ID portion and the data portion can be limited to below predetermined values by increasing the core width of the inductive head to a greater value than the core width of the MR head and by employing the unequal pitch.

The nominal shift quantity of the R/W gap is set so that the offset quantity of the R/W gap in the radial direction becomes zero (0) at the center of the data region. In this way, the offset quantity of the R/W gap in the radial direction can be reduced to half, so that the offset quantity of the ID portion can be further reduced to half.

Because the data storage region of the disk medium is divided into the zones, the burden to the processing of the data system or seek system electronic circuit can be reduced.

Further, the present invention solves the following problems.

Because the magnetic disk apparatus has been packaged into a notebook type personal computer 119 (FIG. 17), etc., the reduction of the size and thickness has been required to this date. Because the notebook type personal computer 119 is mainly of the type which includes a built-in battery and can be operated by the battery in the absence of service of electricity, lower power consumption has been also required. Needless to say, higher reliability of the apparatus, lower cost and higher information processing speed have been required, as well.

To satisfy the requirement for the reduction of the size and thickness, the lamination gap of the disk 105 is reduced to reduce the height by thin film technology of the head 101, and the floating height of the head 101 on the disk surface 105 is reduced to reduce the pitch recorded on the disk surface 105, in the radial direction. Further, the diameter of the disk 105 is reduced so as to reduce the size in the transverse direction. These measures altogether satisfy the requirements described above. To accomplish such a high recording density, the disk 105 must have high quality and must keep this high quality even after it is mounted to the apparatus. Therefore, a head standby region 121 (FIG. 11) is secured on the disk surface 105 lest the head 101 damage the data recorded on the disk surface 105 due to external impact or vibration during shipment or the apparatus or at the stop of its operation, by temporarily fixing the head inside this head standby region during shipment or stop of the apparatus. This head standby region 121 is the region to which the head 101 does not record the data. During the stop of the operation of the apparatus, the surface of the head 101 is likely to adsorb the surface of the disk 105 having high surface accuracy and consequently, a spindle motor 106 cannot rotate from time to time at the start of the operation of the apparatus. To prevent this problem, the head standby region 121 is generally disposed at the position on the surface of the disk 105, at which the starting torque of the spindle motor 106 acts most greatly on the adsorbed head 101, that is, at the innermost circumferential position of the disk 105 within the moving range of the head 101 on the surface of the disk 105. The means described in the prior art references A and B described already has been examined as a method of temporarily fixing the head 101 inside this head standby region 121, but they are not yet free from the following problems.

According to the prior art reference A (JP 6-243605), an arm and a magnet are disposed for fixing the head 101, as the method of temporarily moving and fixing the head 101 to the head standby region 121. Since a space must be secured for these members, there remains the problem for the reduction of the size, thickness and cost of the apparatus.

The prior art reference B (JP 6-251517) describes a magnet for exclusively attracting a magnetic member, as the method of temporarily moving and fixing the head 101 to the head standby region 121.

Besides the prior art references described above, a magnet retract mechanism for attracting the magnetic member described in the prior art reference B by utilizing a leaking magnetic flux of a magnet 102a that constitutes a voice coil motor 102, is known. Since this magnet retract mechanism does not require the disposition of the expensive and exclusive magnet used in the prior art references A and B, it can temporarily move and fix the head 101 to the head standby region 121 by a relatively economical construction. Nonetheless, the magnet retract mechanism still involves the following problems.

The voice coil motor 102 moves the carriage 103 in order to accurately position the head 101 to a desired position on the surface of the disk 105. To improve the information processing speed, the carriage 103 must be moved quickly. However, a sufficient packaging space cannot be secured for the voice coil motor 102 due to the requirement for the small size and thickness, and a large current cannot be caused to flow through the coil 109 fixed to the carriage 103 due to the requirement for lower power consumption. For these reasons, a magnet having a high flux density has been used in the past for the magnet 102a. The position of the magnet 102a providing the greatest attraction force to the magnetic member is near the central portion of the magnet 102a on which the leaking flux is most concentrated. The magnet 102a is disposed in such a manner that when the head 101 exists in the head standby region 102, the position of the magnetic member exists near the position on which the leaking magnetic flux concentrates. Further, the magnetic member must be attracted by the leaking magnetic flux even when the head 101 exists at the outermost circumferential position on the disk surface 105. However, the attracting force to the magnetic member originally impedes the moving force of the carriage 103 which is the role of the voice coil motor 102, and becomes a load to the movement of the carriage 103 in the operation of the apparatus. This is called the "load of the magnetic member". Since a large current must be supplied to the coil 109 to such an extent that this load of the magnetic member can be neglected, problems occur in the aspects of lower power consumption and higher information processing speed. The quantity of the leaking magnetic flux is preferably great so as to efficiently combine the flux of the magnet 102a with the moving force of the carriage 103. The carriage 103 is equipped with the head 103 on one of the sides of an arbitrary axis of rotation and with the coil 109 at the position opposing the axis of rotation. The carriage 103 is supported by the rotary shaft through bearings (not shown) and is allowed to swing. Therefore, the value obtained by converting the mass of the portion rotating with the carriage 103 to the position of the head 101 must be reduced. In other words, besides the reduction of the mass of the carriage 103 itself, the moment of inertia of the carriage must be reduced in accordance with the distance. When the mass of the carriage 103 itself is great, or when the moment of inertia of the carriage is not reduced, the load is caused by the movement of the carriage 103. The greater the distance from the center of rotation 103a of the carriage to the position at which the force of the coil 109 is generated, the smaller becomes the force required for the coil 109. Because the space is limited, however, there is an inevitable limit to this distance.

An FPC (CARRIAGE) (flexible printed board) 114a (FIG. 11) is fixed to the side surface of the carriage 103 so as to transmit the signals of the head 101 to a read/write control substrate 112 and to supply power for driving the coil 104. The higher the rigidity of this FPC movable member routing (CARRIAGE) (flexible printed board) 114a, the smaller becomes its curvature and the greater becomes its repulsive force (hereinafter referred to as the "reaction of the FPC"). When an FPC (CARRIAGE) (flexible printed board) 114a having a high rigidity is used under the package state shown in FIG. 11, the repulsive force becomes maximal when the head. 101 exists at the outermost circumferential position on the surface of the disk 105. The prior art apparatuses move the head 101 to the head standby region 121 disposed at the innermost circumferential position on the disk surface 105 by utilizing the reaction of the FPC, but this reaction of the FPC becomes the load when the carriage 103 is moved in the same way as the load to the magnetic member described above. Accordingly, a large current must be supplied at the time of the operation of the apparatus to such an extent that the reaction of the FPC can be neglected, and the problems in lower power consumption and higher information processing speed take place.

When the apparatus stops operating, the number of revolutions of the spindle motor 106 decreases and the floating height of the head 101 lowers, so that the head 101 comes into contact with the disk surface 105. In the case of the conventional means for moving the head 101 to the head standby region 121, therefore, the traction force of the magnet 102a to the magnetic member must be set by taking the frictional force between the head 101 and the disk 105 at this time into consideration.

Generally, the head yaw angle 101b has been set in the prior art by disposing the position, at which the head yaw angle 101b does not exist, near an intermediate point of the moving range of the head 101 in the radial direction on the disk surface 105 so that the absolute values of the yaw angles 101b become progressively greater in respective directions according to the movements from that position towards the outer or inner circumference on the disk surface 105.

As described above, the prior art technologies do not sufficiently consider the requirements for the reduction of the size and thickness of the apparatus, higher recording density, higher reliability, lower cost and higher information processing speed.

To solve the problems described above, the present invention employs the following construction.

The head standby region 121 on the disk surface 105 is disposed at the innermost circumferential position of the disk 105 within the moving range of the head 101 on the disk surface 105 and the head yaw angle 101b is set so that when the head 101 and the disk 105 come into mutual contact at an arbitrary head position in the radial direction on the disk surface, the carriage 103 always rotates to the inner circumferential side by the direction in which the frictional force acts. Alternatively, the head 101 is disposed in such a manner that the head yaw angle 101b does not change between the opposite signs across zero at an arbitrary position of the head 101b in the radial direction on the surface of the disk 105. Further, a carriage fixing mechanism is disposed so as to temporarily fix the head 105 to a specific position on the surface of the disk 105. The fixing force of this carriage fixing mechanism is set to be greater than the moving force of the carriage 103 due to external impact or vibration. A magnetic member 120 is disposed at a portion rotating with the carriage 103, and there is further provided a magnet retract mechanism for attracting the magnetic member 120 by utilizing a leaking magnetic flux of a magnet 102a that constitutes a voice coil motor 102 for swinging the carriage 103. The head yaw angle 101b is disposed within the range of the head position on the surface of the disk 105 within which the magnetic member 120 can be attracted to the magnet 102a of the magnet retract mechanism. Further, the head 101 is disposed at the innermost circumferential position of the disk 105 within the moving range of the head 101 on the surface of the disk 105 so that the head yaw angle 101b attains a minimum angle.

The construction described above can solve the problems.

The disk standby region 121 on the surface of the disk 105 is disposed at the innermost circumferential position of the disk 105 within the moving range of the head 101 on the surface of the disk 105, and the head yaw angle is set so that when the head 101 and the disk 105 come into mutual contact at an arbitrary position of the head 101 in the radial direction on the surface of the disk 105, the carriage 103 always rotates to the inner circumferential side in the direction in which their frictional force acts. Alternatively, the head 101 is disposed in such a manner that the head yaw angle 101b always exists at an arbitrary head position in the radial direction on the surface of the disk 105. When the apparatus stops operation, the number of revolutions of the spindle motor 106 decreases and the floating height of the head 101 lowers, so that the head 101 and the surface of the disk 105 come into mutual contact. The head yaw angle 101b is set at the position at which the frictional resistance with the side surface 101d of a rail 101a, which is disposed so as to float the head 101 in the rotating direction of the disk 105, becomes minimal, or in other words, the position at which the head yaw angle 101b is reduced is set at the innermost circumferential position of the disk 105 within the moving range of the head 101 on the surface of the disk 105, or at a position which is further on the inner circumferential side. The head 101 is moved to the head standby region 121 as the carriage 103 always rotates towards the inner circumferential side by the frictional resistance to the side surface 101d of the rail 101a at an arbitrary position in the radial direction on the surface of the disk 105. Accordingly, the head 101 can be moved to the head standby position 121 at the stop of the operation of the apparatus and during the inertial rotation of the spindle motor 106 without adding a new component or components.

Because the apparatus is equipped with the carriage fixing mechanism for temporarily fixing the head 101 at a specific position, the head 101 is fixed to the head standby region 121 during shipment of the apparatus or at the stop of its operation. Therefore, it becomes possible to prevent the head from damaging the information recorded on the surface of the disk 105 by external impact or vibration and to prevent unability of the rotation of the spindle motor 106 at the start of the operation of the apparatus due to adsorption of the surface of the head 101 to the surface of the head 105 having high surface accuracy which occurs at the stop of the operation of the apparatus.

Because the fixing force of the carriage fixing mechanism is greater than the moving force of the carriage 103 due to external impact or vibration, the head 101 does not fall off from the head standby region 121 during shipment of the apparatus or at the stop of its operation.

The apparatus includes the magnet retract mechanism for attracting the magnetic member 120 disposed at the portion rotating with the carriage 10 by utilizing the leaking magnetic flux of the magnet 102a constituting the voice coil motor 102 for swinging the carriage 103, and the head yaw angle is disposed so as to be the same sign within the moving range of the head 101 on the surface of the disk 105 within which the magnetic member 120 can be attracted by the magnet 102a of the magnet retract mechanism. When the apparatus stops its operation, the number of revolution of the spindle motor 106 decreases and the floating height of the head 101 lowers, so that the head 101 comes into contact with the surface of the disk 105. The head yaw angle 101b is set to the position at which the frictional resistance with the side surface 101d of the rail 101a disposed for floating the head 101 in the rotating direction of the disk 105 becomes minimal, or in other words, the position at which the head yaw angle 101b is reduced is set within the range on the surface of the disk 105 in which the magnetic member 120 disposed at the portion rotating with the carriage 103 can be attracted by the leaking magnetic flux of the magnet 102a constituting the voice coil motor 102 for swinging the carriage 103. Therefore, the head 101 moves to the head standby region 121 within the range on the surface of the disk 105 in which the magnetic member 120 can be attracted by the leaking magnetic flux of the magnet 102a, by the frictional resistance with the side surface 101d of the rail 101a on the disk surface. Next, when the magnetic member 120 of the carriage 103 is attracted by the leaking magnetic flux of the magnet 102a, the head 101 is fixed to the head standby region 121. Accordingly, the head 101 can be moved to the head standby region 121 at the stop of the operation of the apparatus without adding a new component or components. At the time of shipment of the apparatus, on the other hand, the head 101 can be fixed to the head standby region 121 while the load of the magnetic member during the operation of the carriage 103 and the reaction of the FPC are kept minimum.

Because the head 101 is disposed at the innermost circumferential position of the disk 105 within the moving range of the head 101 on the disk surface so that the head yaw angle becomes minimal, the head can obtain a floating height, which is as uniform as possible, at all the position on the disk surface.

As described above, the present invention can provide a method, and an apparatus therefor, which can accomplish the reduction of size and thickness of the apparatus, higher recording density, higher reliability, lower power consumption, lower cost and higher information processing speed, and can move and fix the head 101 to the head standby region 121 during shipment of the apparatus and at the stop of its operation.

DESCRIPTION OF THE PREFERRED EMBODIMENTS

Embodiments

Hereinafter, preferred embodiments of the present invention will be explained with reference to the accompanying drawings.

Figure 9:
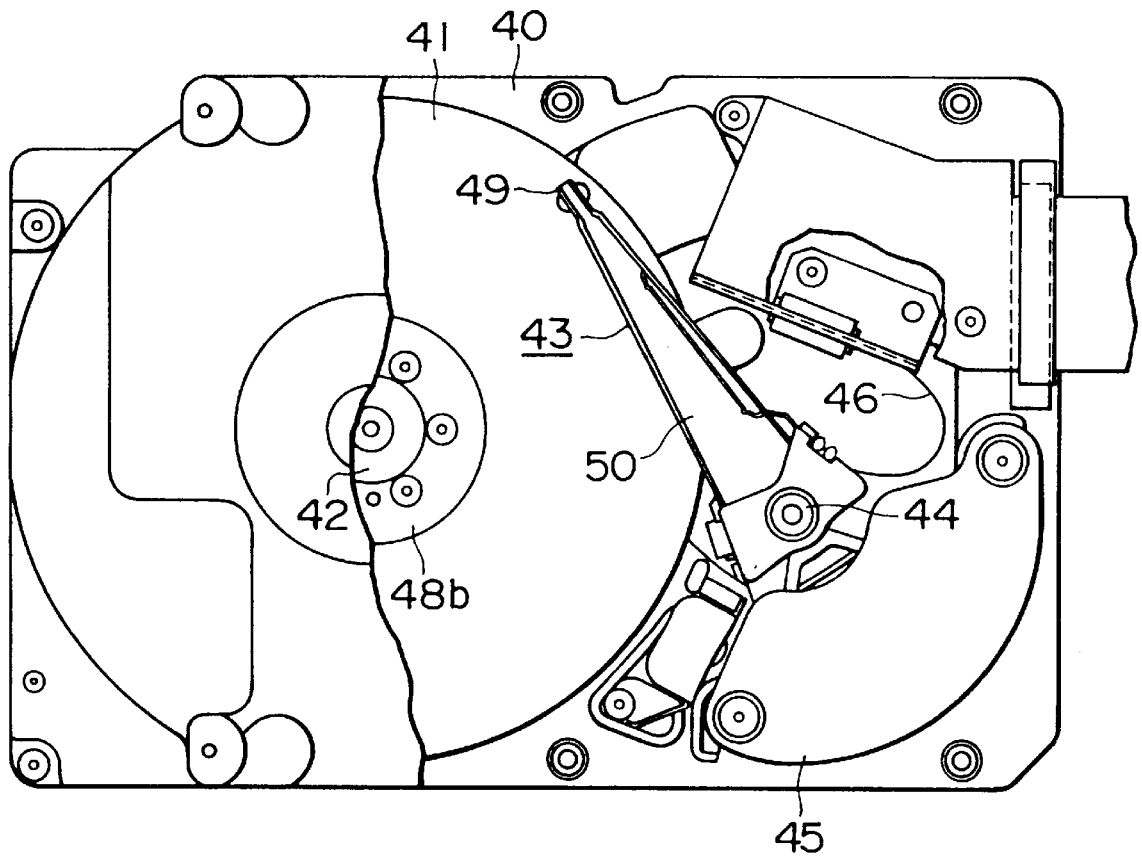
FIG. 9 is a plan view showing a magnetic disk apparatus according to one embodiment of the present invention.
Figure 10:
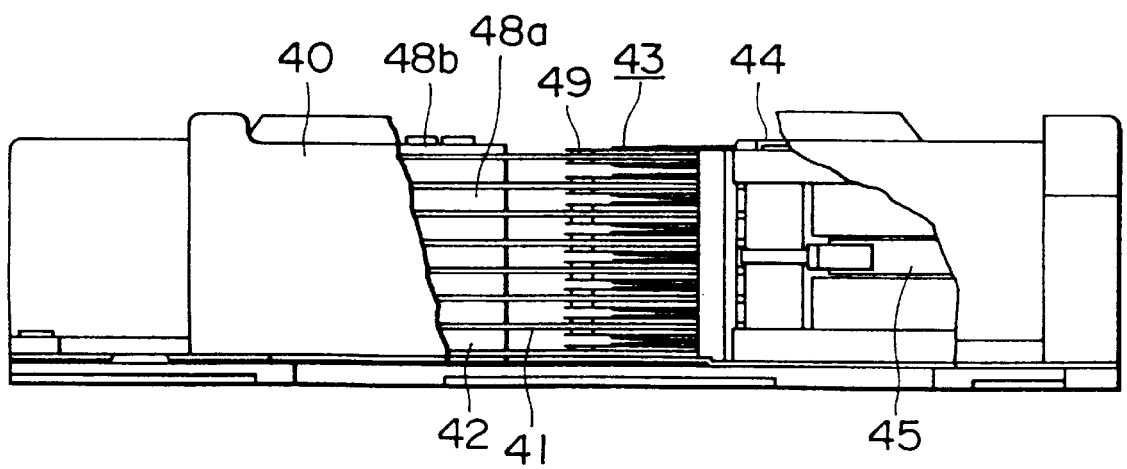
FIG. 10 is a side view of the magnetic disk apparatus.

Referring initially to FIGS. 9 and 10, a magnetic disk apparatus will be explained.

The magnetic disk apparatus includes, for example, a sealed container 40 (FIG. 9), a disk 41 as a magnetic medium, a spindle motor 42 for supporting and rotating the disk 41, a head assembly 43 having a magnetic head for reading out information from the disk 41 and a suspension arm 50, a swing arm inclusive of a bobbin shaft 44 for supporting the head assembly and swinging it over the disk, a voice coil motor 45 for driving the swing arm, a circuit for causing the magnetic head to write and read information to and from the disk 41 and a printed wiring board 46 electrically connected to a controller for controlling the operations of the spindle motor 42 and the voice coil motor 45.

The disk 41, the spindle motor 42, the head assembly 43, a part of the printed wiring board 46 and the voice coil motor 45 are accommodated in the container 40 and are sealed by the container 40.

The spindle motor 42 is a so-called "in-hub type" motor which includes a hub for fixing the disk, disposed round the outer periphery thereof, and wherein a rotor and a stator are disposed inside the hub. The spindle motor 42 is disposed on a base member that constitutes the container 40.

The disk 41 is an important component which determines a data storage capacity of the magnetic disk apparatus. Generally, one or a plurality of disks are employed in accordance with a required storage capacity. In this embodiment, the disks 41 and disk spacers 48a (FIG. 10) are alternately loaded into the hub of the spindle motor 42. A disk clamp 48b pushes the laminate of the disks in the axial direction of the spindle motor 42 and so fixes the disks 41 to the spindle motor 42.

A plurality of swing arms are employed in accordance with the number of disks 42, and each comprises a slider 40 for supporting thereon the magnetic head and a suspension arm 50. Each swing arm is rotatably fixed by a pivot shaft 44 to the base member.

The magnetic head is a dual head formed by integrating a thin film head for writing data and a magneto-resistive head for reading the data, and is mounted to each slider 49.

The magnetic disk apparatus according to this embodiment employs a rotary actuator and data surface servo, and has one ID information (ID portion) and one servo information (a signal comprising at least one burst signal and used for determining the position) in one sector (hereinafter referred to as the "1 ID/1 servo system").

Figure 3:
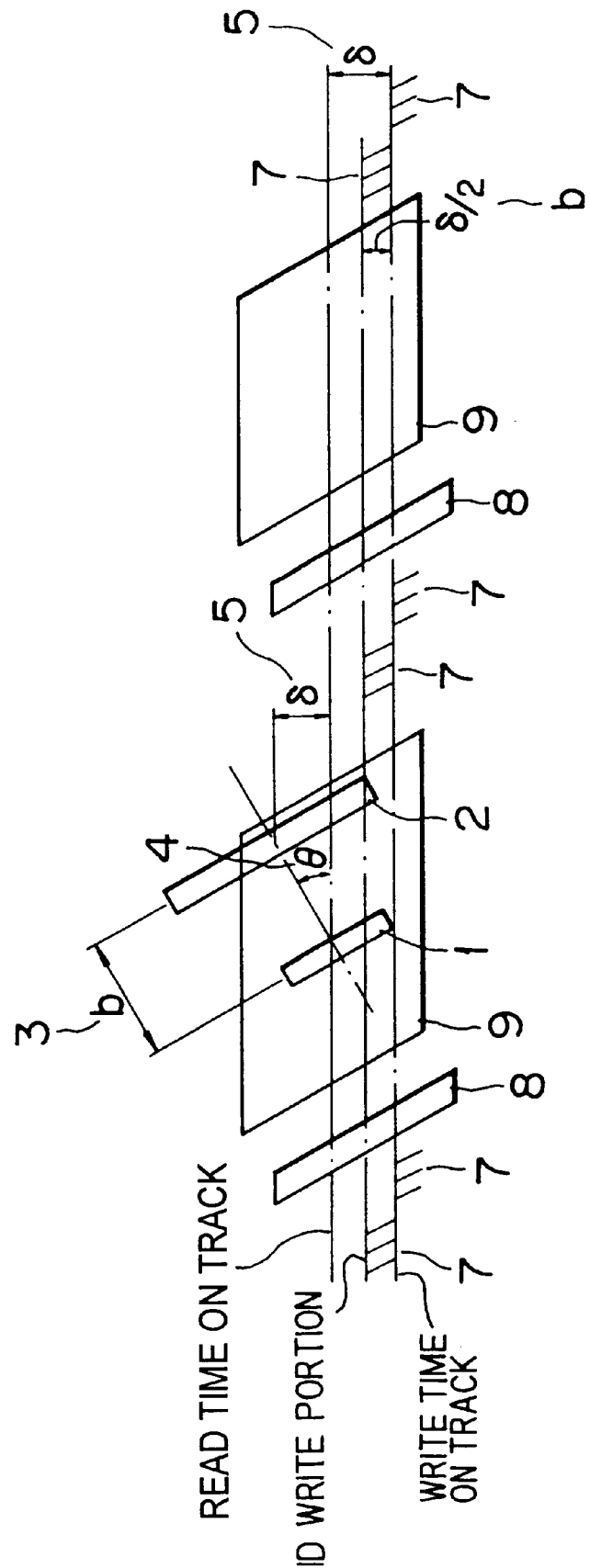
FIG. 3 is a perspective view showing a format of tracks on a medium disk according to one embodiment of the present invention.

In this embodiment, a servo pattern 7 is written to a position at which the MR head 1 is positioned at the time of write of the inductive head 2, as the servo information (FIG. 3).

Figure 1:
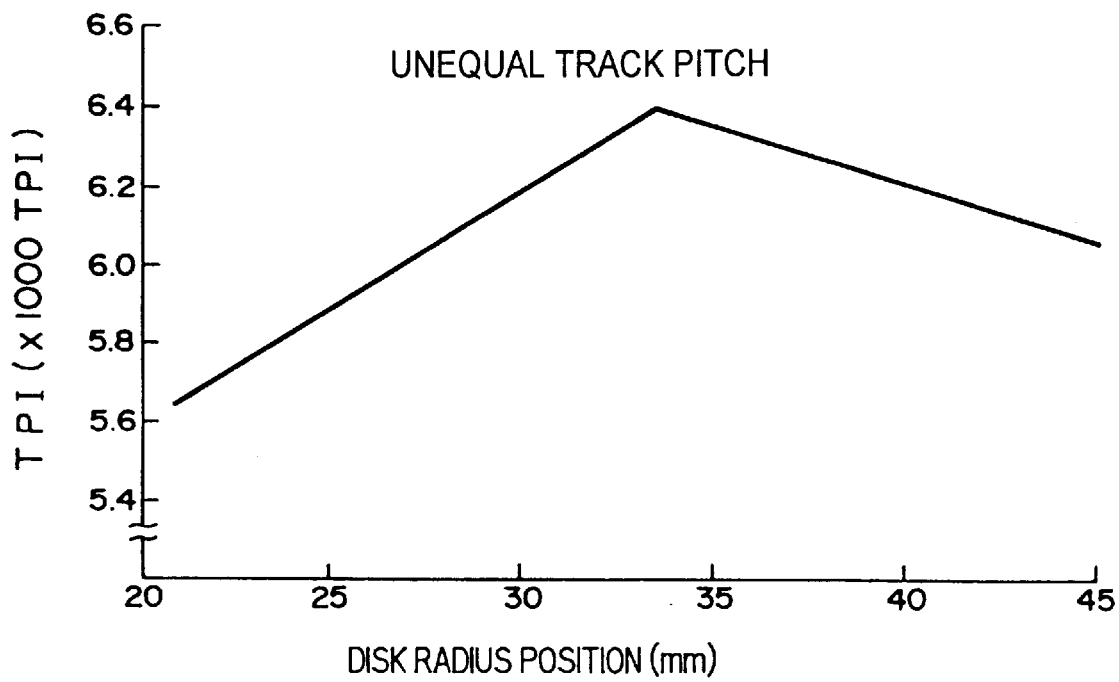
FIG. 1 is a diagram showing a track density at positions on a disk medium in a radial direction of a disk.

FIG. 1 shows a set example of unequal track pitches in the present invention.

The track pitch is set to a large pitch at the inner and outer peripheral portions of the disk medium as the information storage region and to a small pitch at the center of the information storage region of the disk medium so as to linearly change the pitch.

As a result, the error rate of the ID portion of the sector in each track and the error rate of the data portion can be set to better numerical values (lower numerical values) than $1\times10^{-6}$ and $1\times10^{-8}$, respectively, with respect to the positions in the radial direction of the disk on the disk medium (hereinafter referred to as the "radius positions").

In this embodiment, the distance from the gap center of each of the MR head 1 using the magneto-resistive effect and the inductive head 2 to the rotary shaft of the spindle (the difference of the radii on the disk medium; hereinafter referred to as the "radius difference") is so set in the dual head as to satisfy the condition represented by the line 30 in FIG. 8. In other words, the radius difference of the MR head 1 and the inductive head 2 of the dual head is 0 at the center of the information storage region of the disk medium. The track pitch is set to a narrow pitch at this position and to a large pitch in the data region in which the radius difference becomes great (the inner periphery or the outer periphery). In this way, the track pitch is enlarged in the region where the radius difference becomes great, that is, where the error rate of the ID portion gets deteriorated, and is reduced in the region where the radius difference becomes small, so as to improve the error rate of the ID portion.

Figure 2:
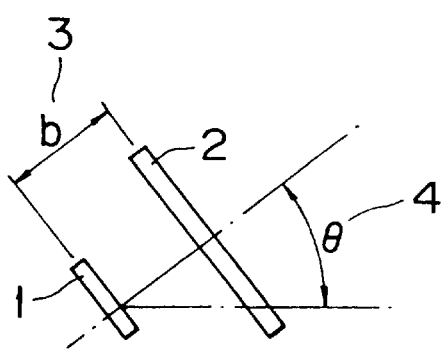
FIG. 2 is an explanatory view showing a positional relationship of each magnetic gap of a dual head.

FIG. 2 shows a structural example of the dual head.

The dual head of this embodiment has the structure wherein a magneto-resistive head 1 (MR head 1) for exclusively reading out the data is fitted to the distal end of one head core (not shown) and the inductive head 2 is disposed at a position spaced apart by a predetermined gap distance b from the MR head 1.

A head yaw angle 4 of $\theta=\theta(r)$ exists as one of the functions of the radius (r) on the disk in the rotary actuator. In the rotary actuator, the radius position at the time of write of information deviates from the radius position of the head at the time of read of the information with respect to the disk medium or to the spindle shaft other than when the gap distance b is 0, or when $\theta=0$.

FIG. 3 shows the radius position of the dual head at the time of data write or data read, the servo pattern and the radius positions of the ID portion and the data portion in this embodiment. In the drawing, the term "Write Time On-Track" represents the center line of the servo pattern, the term "ID Portion On-Track" represents the center line of the ID portion, and the term "Read Time On-Track" represents the center line of the data portion.

In the dual head (FIG. 2), a radius differences of $\delta=b.\sin\theta$ occurs on an arbitrary track between the radius position to which the MR head 1 is positioned at the time of read of the MR head 1 and the radius position to which the MR head 1 is positioned at the time of write of the inductive head due to the gap distance b (the distance between the gaps of the MR head and the inductive head) (3) and the head yaw angle $\theta$ (4) ($\delta$: the radius difference due to $\theta$ and the gap distance b, measured at the gap center of each of the MR head and the inductive head).

As the servo information, this embodiment employs a 1 servo system which writes the servo pattern 7 to the position to which the MR head 1 is positioned at the time of write by the inductive head.

To obtain performance of the magnetic disk apparatus and to particularly accomplish high density recording with high reliability, it is necessary to dispose the ID portion in each sector, to acquire the information of each sector by reading the ID portion, or to write the information to each sector. In other words, it is necessary to read the ID portion by the MR head 1 both when the data is read out and when the data is written.

In this embodiment, the write radius position of the ID portion is set to an intermediate point between the positioning radius of the MR head when the MR head reads the data and the positioning radius position when the inductive head writes the data. As a result, a write is made to the position of ½ of $\delta$ so that the offset distance from the positioning radius position of the MR head becomes minimal, and the offset distance can be therefore reduced from $\delta$ to $\delta/2$. Here, symbol $\delta$ represents the radius difference measured at the gap center of each of the MR head and the inductive head by $\theta$ at an arbitrary track position and the gap difference b.

In comparison with the dual head according to the prior art having the ID portion and the servo information, the reduction of the offset distance described above in the present invention provides a remarkable effect from the aspect of the information storage capacity.

As described above, the data portion 9 is written to the positioning position of the MR head 1 at the time of data read, and the ID portion 8 is written to the position spaced apart by the distance $\delta/2$ from the data portion 9 (FIG. 3).

Figure 4:
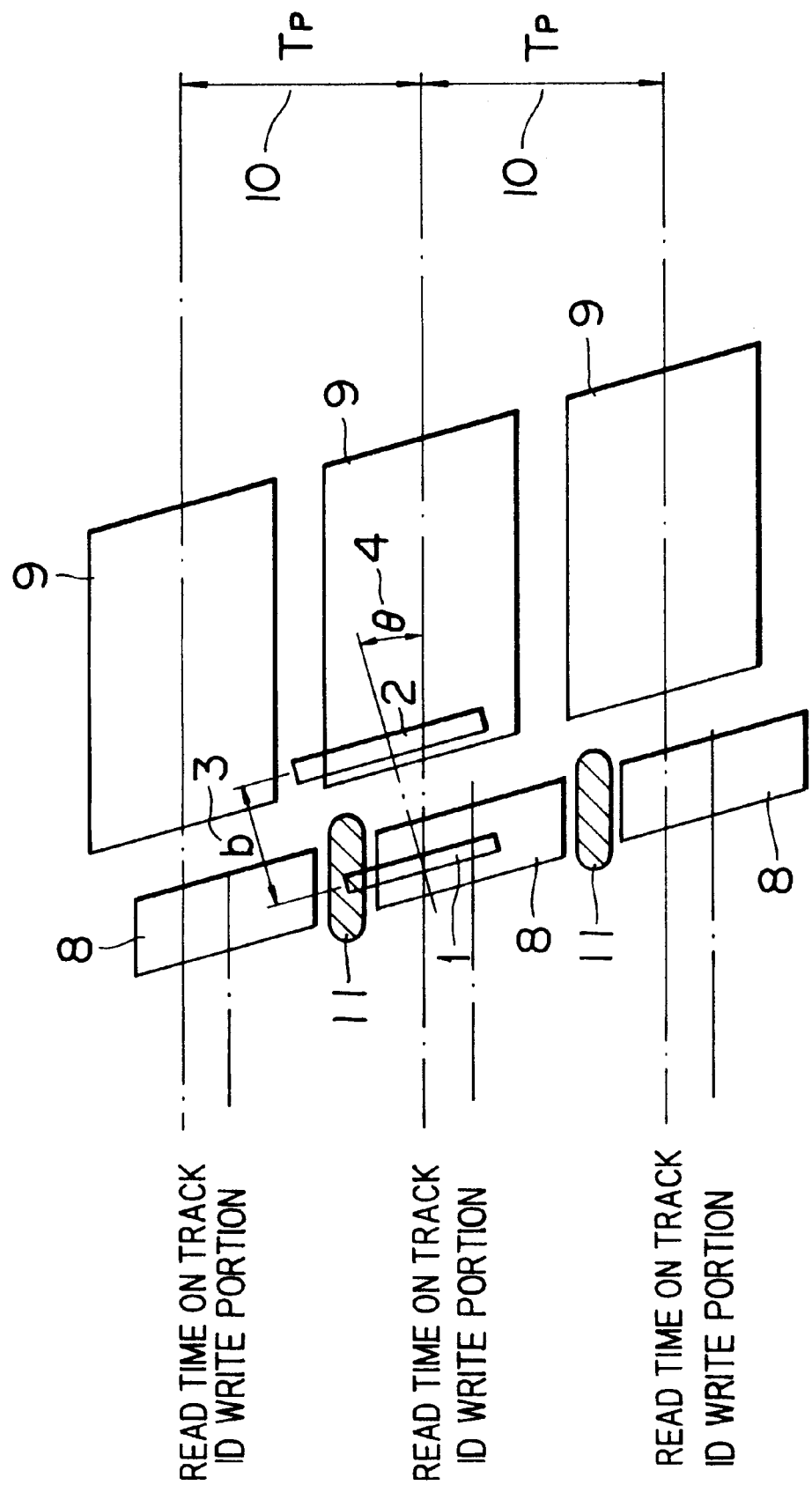
FIG. 4 is an explanatory view useful for explaining the influences of a residual noise at an ID portion.

FIG. 4 is an explanatory view when any residual noise exists at the ID portion. When the residual noise 11 exists, the MR head 1 in this embodiment reads the residual noise 11 of the ID portion at the position where it reads the data portion 9 when the MR head 1 reads the ID portion 8, and the error rate of the ID portion thus drops. Therefore, the influences of the residual noise 11 at the ID portion can be eliminated by erasing the ID portion and then writing the ID portion 8. Erasure is effected by the inductive head 2 having a greater core width than the MR head 1. In FIG. 4, reference numeral 10 denotes a track pitch $T_p$.

TABLE 1

| Inequal track pitch error rate (Table 1) | | | | |
|---|---|---|---|---|
| | inner periphery | | outer periphery | |
| | ID portion | data portion | ID portion | data portion |
| equal track pitch | $2 \times 10^{-6}$ | $4 \times 10^{-10}$ | $2 \times 10^{-6}$ | $8 \times 10^{-10}$ |
| inequal track pitch | $9 \times 10^{-7}$ | $3 \times 10^{-10}$ | $1 \times 10^{-6}$ | $3 \times 10^{-10}$ |

Table 1 represents the typical values of the error rates of the data portion and the ID portion when the data is written in the unequal pitch shown in FIG. 1 and when it is written in the equal pitch.

In the case of the equal track pitch, the error rate of $1\times10^{-9}$ can be secured for the data portion, but the error rate of the inner periphery of the ID portion is $2.3\times10^{-6}$ and fails to satisfy the specification $1\times10^{-6}$. In contrast, when the inequal track pitch is employed, the error rates of $1\times10^{-6}$ and $1\times10^{-9}$ can be secured for the ID portion and the data portion, respectively.

Figure 5:
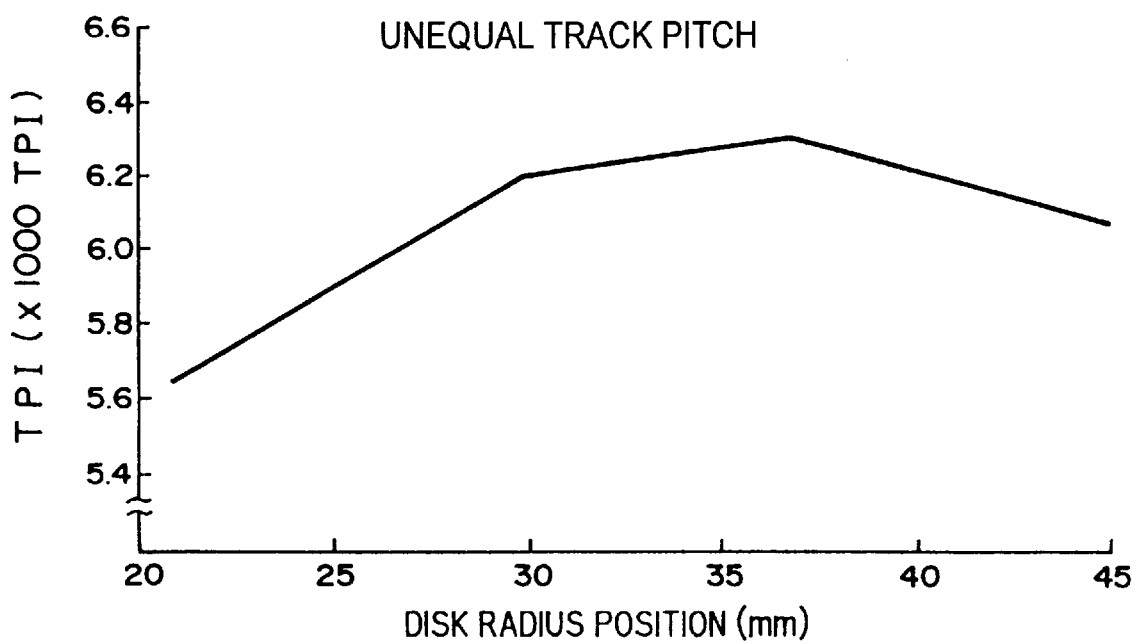
FIG. 5 is a diagram showing the track density at positions on the disk medium in the radial direction of the disk when a track pitch is set so that the change component of a carriage rotational angle is not greater than 7%.

FIG. 5 shows a set example where the unequal pitch is set so that the change rate of the rotational angle of the carriage corresponding to the change of the track pitch becomes not greater than 7%. In comparison with FIG. 1, the curve comprises the combination of three straight lines to suppress the change of the track pitch. Originally, the change of the track pitch need not be a straight line but may be an arbitrary curve. In this embodiment, the change comprises the combination of the straight lines for ease of data processing. When the change rate is not greater than 7%, signal processing from the servo track, signal processing from the tracks at the time of seek, and signal processing from the tracks when the data acquired can be accomplished by a simple circuit in an electronic circuit of the magnetic disk apparatus.

Figure 6A:
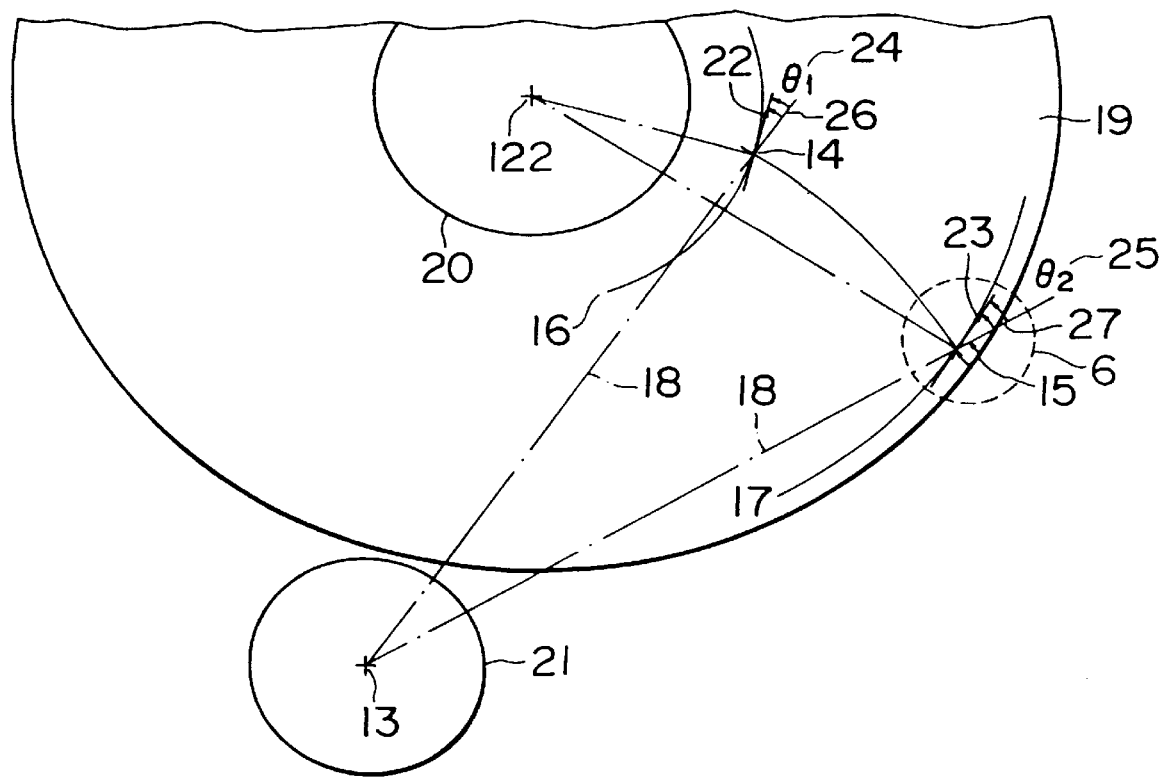
FIGS. 6A and 6B, which is an enlarged partial view taken from broken line circle 6 shown in FIG. 6A, are useful for explaining a yaw angle of a magnetic head.
Figure 6B:
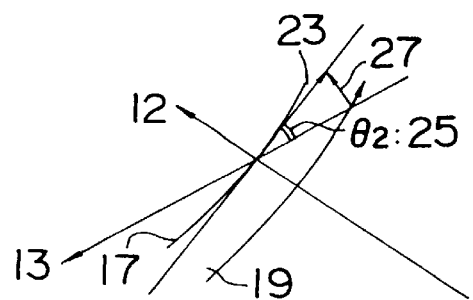

FIGS. 6A and 6B show various quantities such as the yaw angles θ1 (24), θ2 (25) of the magnetic heads and the geometrical disposition at which the actuator receives a force in the inner circumferential direction of the disk at the time of CSS.

The actuator (not shown) is supported by a carriage bearing 21 and swings with a center 13 of the rotation of the carriage. The dual head (not shown) is fitted to the actuator at the position of a distance 18. The actuator rocks on the disk 19 between the zone innermost circumferential radius position 16 and the zone outermost circumferential radial position 17, and the yaw angle changes between the head yaw angles θ1 (24) and θ2 (25). In FIG. 6A, reference numeral 22 denotes the force in a tangential direction that acts on the slider at 14 at the time of CSS, reference numeral 23 denotes the force in the tangential direction that acts on the slider at 15 at the time of CSS, reference numeral 26 denotes the force in the carriage rotating direction that acts on the slider at 14 at the time of CSS, and reference numeral 27 denotes the force in the carriage rotating direction that acts on the slider at 15 at the time of CSS.

In this embodiment, the center 12 of the rotation of the spindle, the center 13 of the rotation of the carriage and distance 18 of the magnetic head and the carriage are adjusted and the yaw angle is set so that the carriage at the time of CSS always faces the inner circumferential direction by the force of friction between the head and the disk. Since the yaw angle is set in this way, it becomes possible to insure that the head always effect CSS round the inner circumference.

Figure 7:
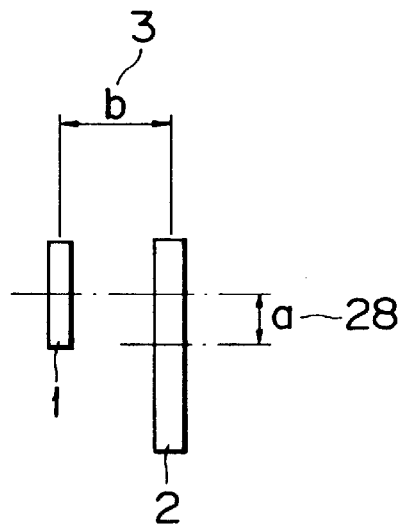
FIG. 7 is an explanatory view showing the positional relationship of each gap when a nominal quantity a is set to an inductive head 2 and an MR head 1 in the dual head.
Figure 8:
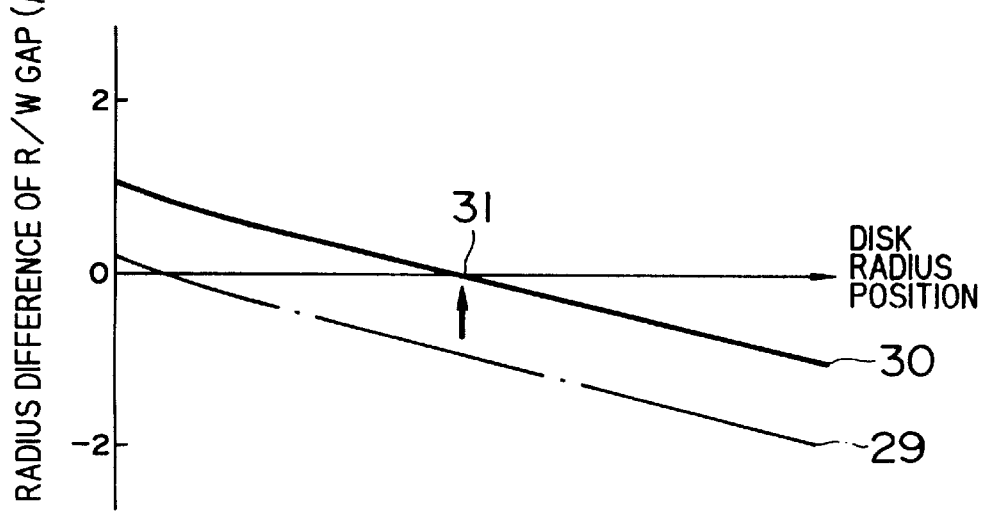
FIG. 8 is a diagram useful for explaining an R/W offset quantity as an apparatus as a whole when the dual head is used.

FIGS. 7 and 8 show an example of the dual head wherein a nominal shift quantity a is set between the MR head 1 and the inductive head 2.

When the nominal shift quantity a is set to 0 (FIG. 2), dotted line 29 in FIG. 8 represents the radius difference δ generated by the gap distance b between the MR head 1 and the inductive head 2 and by the yaw angle θ of the head in the radial direction of the disk medium. Here, the difference of the R/W gap radiuses is set so hat it becomes substantially zero (0) on the inner circumference of the disk.

The offset distance of the ID portion in, the disk medium format of this embodiment, becomes δ/2 (FIG. 3) when the nominal shift quantity a is 0 (FIG. 2). Therefore, $δ/2_{max}$ is about 1 μm (29 in FIG. 8).

When the nominal shift quantity a is further adjusted so that the difference of the R/W gap radiuses becomes zero at the center of the data region, the offset distance δ/2 of the ID portion can be reduced to about 0.5 μm. For this reason, deterioration of the error rate of the ID portion can be further improved. Reference numeral 31 in FIG. 8 denotes a radial position at which the yaw angle becomes zero (0).

Next, another embodiment of the present invention will be explained.

The basic construction of the magnetic disk apparatus according to another embodiment will be explained.

A disk 105 (FIG. 11) for magnetically recording information, made of aluminum or glass as a substrate material and having a magnetic film formed on the surface thereof, is driven for rotation by a spindle motor 106. The spindle motor 106 includes a motor shaft 106f made of a stainless steel, and a hub 106a precisely rotating through bearings 106b pushed into upper and lower portions of the motor shaft 106f and made of an aluminum. The bearings are biased in advance in an axial direction by a spring (not shown). A motor magnet 106c of a permanent magnet is fixed on the inner surface of a hub 106a opposing a motor coil 106d fixed between the motor bearings 106b of the motor shaft 106f, and the hub 106a is rotated when a current is applied to the motor coil 106d. The disk 105 is inserted into the hub 106d and is fastened to the hub 106a by using a clamp ring 104 made of aluminum, stainless steel or iron and having a ring-like shape. The clamp ring 104 can be fastened to the hub 106a by shrinkage fit, or to the upper surface of the hub 106a by a screw. A head 101 is equipped with an electromagnetic conversion unit for converting and obtaining an electric signal for magnetically writing or reading information with a magnetic field, by floating above the surface of the disk 105 which is driven for rotation, with a predetermined gap of about 0.1 μm. A carriage 103 is made of aluminum or magnesium and is used for accurately positioning the head 101 to the surface of the disk 105. The head 101 and the carriage 103 are driven and positioned by a voice coil motor 102 comprising a coil 109 produced by coiling an aluminum or copper wire equipped with an insulating film, a magnet 102a of a permanent magnet and a yoke 102b for supporting the magnet 102a and forming a magnetic circuit. One of the yokes 102b, which are disposed on and below the coil 109, is equipped with two kinds of magnets, that is, a magnet 102a having an S polarity with respect to the coil 109 and a magnet 102a having an N polarity to the coil 109. These magnets are disposed along an arc along which the coil 109 rotates to the right and left from the center of the moving angle of the coil 109 when the head 101 moves so as to write or read the information to or from the disk surface 105. The magnet 102a is fixed at a symmetric position of the other yoke 102b with respect to the position of the magnet 102 while interposing the coil 109 between them, and the polarity of this magnet 102a is opposite to that of the opposed magnet 102a. The carriage 103 can be driven and positioned by power and the current while regulating their direction to the coil 109 wound in the same direction between the magnets 102a.

The read/write signal of the head 101 is transmitted by the thin wire of the solenoid coil disposed on the head 101 to the carriage 103 (not shown), then to a read/write control substrate 112 for controlling the read/write signal of the head 101 by FPC (CARRIAGE) flexible printed board) 114a (FIG. 11), and to the outside of the HDA by a sealed connector 110 (FIG. 12) bonded to a base 7 made of aluminum, stainless steel or iron and positioned on the lower surface of the read/write control substrate 112. The sealed connector 110 relays the electric signals inside and outside the HDA, and a plurality of pins for transmitting the signals and a mold portion for holding the pins are sealed completely. The current of the coil 109, too, is transmitted to the sealed connector 110 (FIG. 12) through the FPC (CARRIAGE) 114a (FIG. 1).

Figure 11:
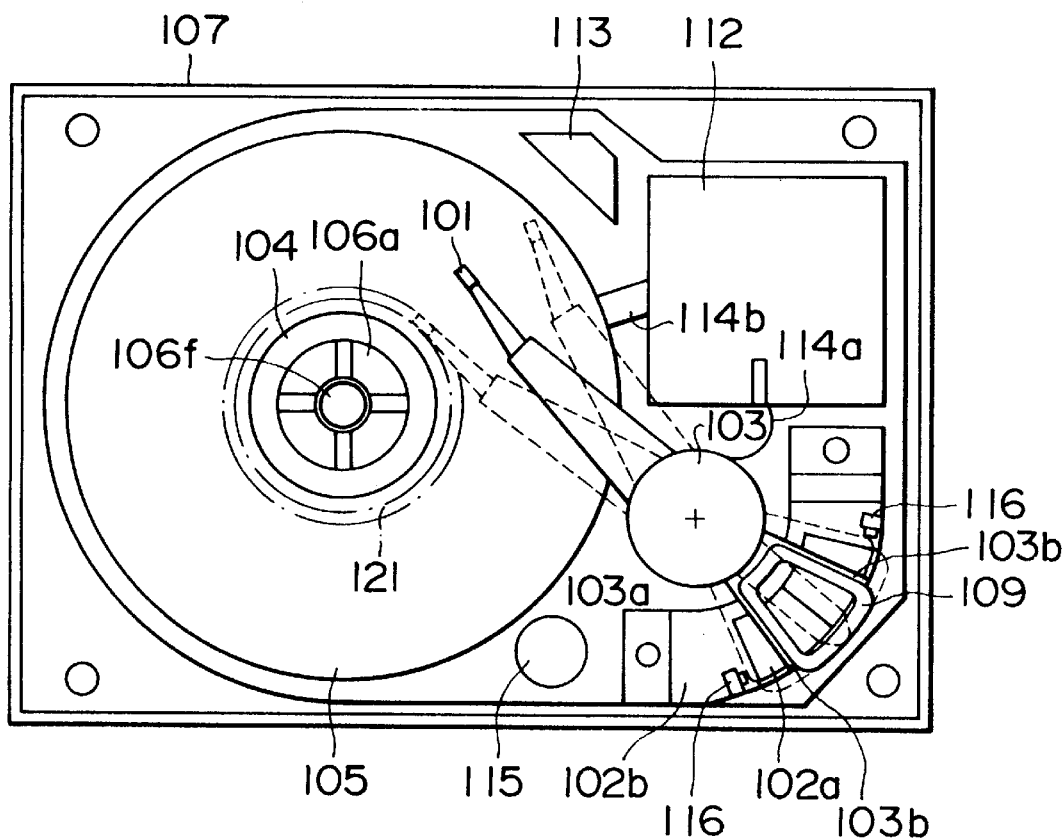
FIG. 11 is a top view when a cover is open in one embodiment of the present invention.
Figure 12:
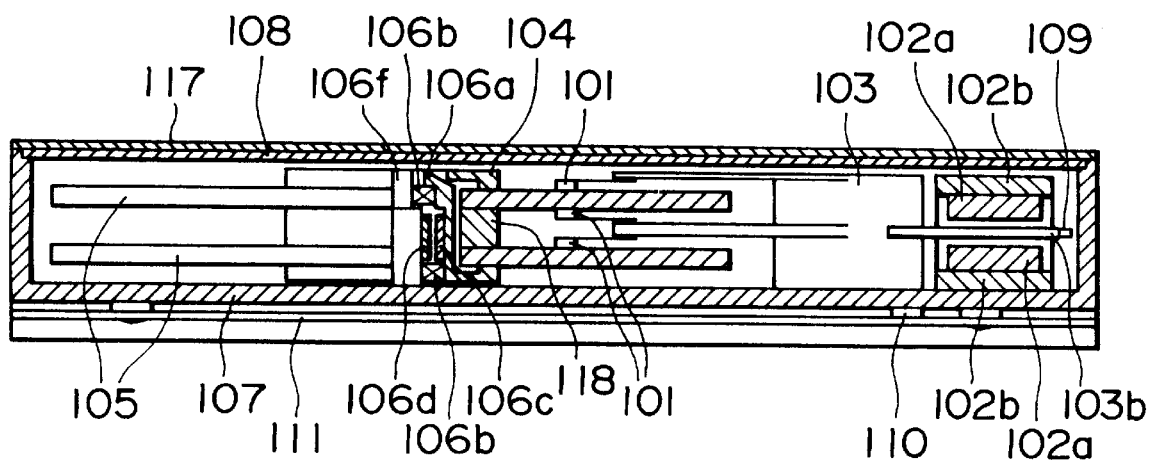
FIG. 12 is a side view of another embodiment of the present invention.

The driving current of the spindle motor 106 is transmitted by the FPC (MOTOR) 114b (FIG. 11) to the sealed connector 110 (FIG. 12). When the noise due to the noise current of the spindle motor 106 impedes the read/write signal of the head 101, only the driving current of the spindle motor 106 is connected to another sealed connector in some cases. The sealed connector 110 (FIG. 2) is connected to a circuit board 111 for controlling the devices disposed outside the head disk assembly (HDA). A stopper 116 (FIG. 11) is disposed so as to prevent the carriage 103 from uncontrollably moving at the time of abnormality when an excessive current flows through the coil 109 and to prevent the head 101 from damaging the disk 105 and also to prevent it from falling off from the disk surface 105. The rotary center shafts of the motor shaft 106f and the carriage 103 and the voice coil motor 102 are fixed to the base 107, and a cover 108 made of aluminum, stainless steel or iron is fixed by screws to the base 107. The portion near the screw hole disposed in the cover 108 is recessed lest the screw head protrude from the upper surface of the cover 108. To seal the inside of the HDA from outside, a seal 117 formed by applying an adhesive to one of the surfaces of a metal foil having a thickness so as not to permeate moisture is bonded to the joint surface between the base 107 and the cover 108.

In the HDA having the construction described above (FIG. 12), inclusions must not enter the internal space and must not either hinder the magnetic field during the write or read operation of the information between the head 101 and the disk 105, in order to correctly process the signals. To always keep cleanness, therefore, an internal filter 113 (FIG. 11) is disposed so as to collect internal dust by the circulation of air inside the HDA generated by the rotation of the disk 105. An air conditioning agent 115 is mounted so as to make humidity control inside the HDA and to adsorb the gas so as to always keep the humidity inside the HDA within a predetermined range and to improve reliability of the apparatus by adsorbing the gas which might exert adverse influences on the contact withstand strength between the head 101 and the disk 105. A magnetic disk apparatus having a large capacity has a plurality of disks 105 mounted thereto so as to obtain a high memory capacity, and the head 101 exists on the surface of each disk 105. Therefore, disk spacers 118 are disposed between the disks 105 and 105, and the gaps between the heads 101 and 101 are kept constant by precisely finishing the fitting surface of the carriage 103 for fitting the head 101.

Structures for moving and fixing the head 101 in a head standby region 121 at the time of shipment or the stop of the operation of the apparatus, which can accomplish the reduction of the size and thickness of the apparatus, a higher recording density, higher reliability, lower power consumption, a lower cost and a higher information processing speed, will be explained with reference to FIGS. 11 to 16.

Figures 13A, 13B:
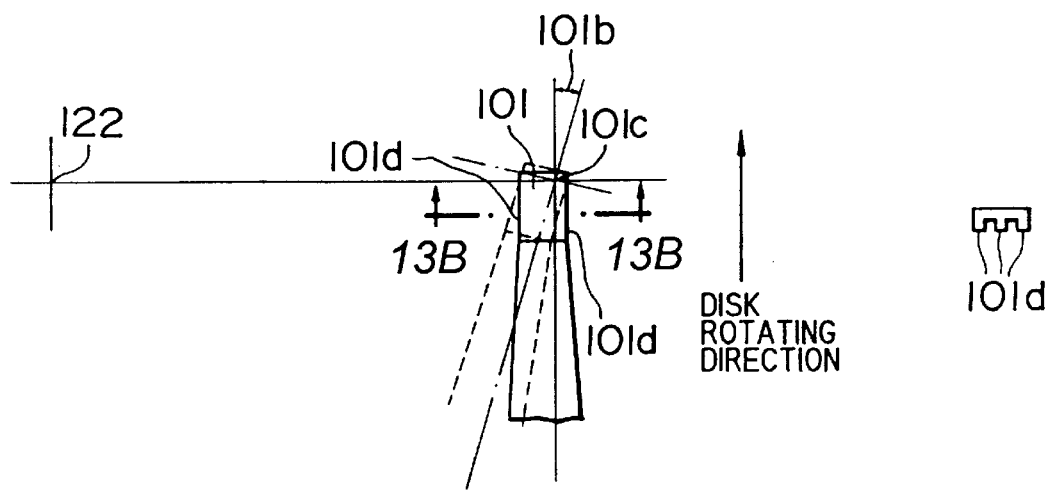
FIGS. 13A and 13B, which is taken along line 13B—13B in FIG. 13A, are explanatory views useful for explaining the yaw angle in another embodiment of the present invention.

FIG. 11 is a top view under the state where the cover 108 is open in the embodiment of the present invention. In the drawing, the positions of the head 101, the carriage 103 and the coil 109 are represented by dotted lines when the head 101 exists at the innermost circumferential position and the outermost circumferential position on the disk surface 105. FIG. 12 is a sectional view of FIG. 11. The head standby position 121 (FIG. 11) on the disk surface 105 is disposed at the innermost circumferential position within the range in which the head 101 moves on the disk surface 105. FIGS. 13A and 13B are schematic views showing setting of the yaw angle 101b. The head 101 represented by solid line shows the state where the yaw angle 101b of the head 101 does not exist. A side surface 101d of a rail 101a is positioned at right angles to a line connecting a recording/reproduction portion 101c of the head 101 for writing/reading the information to and from the disk 105 to the center of the rotation 122 of the disk. When the apparatus stops, the number of revolutions of the spindle motor 106 drops and the floating height of the head 101 lowers, so that the head 101 comes into contact with the disk surface 105. When the rotation of the spindle motor 106 completely stops, the head 101 on the disk surface 105 stops at a position in the vicinity of the position at which the frictional resistance of a lubricating agent for the side surface 101d of the rail 101a in the rotating direction of the disk 5 is the smallest by the lubricating agent on the disk surface 105 and the rail 101a (FIGS. 13A and 13B) disposed on the side of the disk surface 105 of the head 101 for floating the head 101 is the smallest, that is, at the position at which the head yaw angle 101b does not exist, provided that the load does not exist when the carriage 103 is moved. This phenomenon can be reproduced even when the size of the head 101 is further reduced in the future because the friction develops between the side surface 101d of the rail 101a and the lubricating agent so long as the apparatus employs the construction wherein the number of revolutions of the spindle motor 106 lowers at the time of the stop of the apparatus, the floating height of the head 101 decreases and then the head 101 comes into contact with the disk surface 105, provided that the shape of the head 101 is not spherical, for example, and that the side surface 101d of the rail exists. Accordingly, the head yaw angle 101b in this embodiment is set to the innermost inner circumferential position of the disk 105 within the moving range of the head 101 on the disk surface 105, or to an inner circumferential position further inside the former, so that the head yaw angle 105 disappears. In consequence, when the position at which the head yaw angle 101b disappears is set to the inner circumferential position of the disk 105 within the moving range of the head 101 on the disk surface 105, the head yaw angle 101b on the disk surface 105 lies in the direction represented by the dash line in FIG. 13A with the exception that the head 101 exists in the head standby region 121. When the position at which the head yaw angle 101b disappears is set to the position further inside the innermost circumferential position of the disk 105 within the moving range of the head 101 on the disk surface 105, the head yaw angle always lies in the direction represented by the dash line in FIG. 13A. Accordingly, when the head 101 and the disk 105 come into mutual contact at an arbitrary head position 101 in the radial direction on the disk surface 105, the carriage 103 is allowed to rotate on the inner circumferential side in accordance with the direction in which the frictional force between them acts.

Even when the ordinary rotational load of the carriage 3 and the reaction of the FPC exist, the frictional force with the disk surface 105, which is required for moving the head 101 from the outermost circumferential position to the innermost circumferential position on the disk surface 105 can be sufficiently satisfied within the inertial rotation of the spindle motor 106 when the apparatus stops. The rotational load of the carriage 3 is reduced by reducing as much as possible the conversion value of the moment of inertia of the carriage 103, as the load when the carriage 103 is moved, to the head position 101. The movement of the carriage 103 for moving the head 101 to the head standby position 121 when the apparatus stops does not depend on the reaction of the FPC. Therefore, the reaction of the FPC is reduced by employing a thin FPC (CARRIAGE) (flexible printed board) 114a (FIG. 11) and disposing and fixing it to the side surface of the carriage in such a manner as to obtain a maximum curvature so as to minimize rigidity. As described above, when the apparatus stops, the head 101 can be moved to the head standby region 121 on the disk 105 during the inertial rotation of the spindle motor 106 under the state where the rotational load of the carriage 103 in its operation and the reaction of the FPC are reduced to minimum, without adding a new component or components. At the start of the operation of the apparatus, on the other hand, the head 101 floats and hence, friction with the disk surface 105 does not occur, and no influences at all exist on the ordinary operation of the apparatus during the rotation of the operation 103. (Floating fluctuation of the head 101 will be explained elsewhere.)

A fixing mechanism for the carriage 103 is provided so as to temporarily fix the head 101 to a specific position on the disk surface. Therefore, the head 101 is fixed to the head standby region 121 during shipment or stop of the apparatus, and it becomes possible to prevent troubles such as the damage of the information recorded on the disk surface 105 by the head 101 due to external impact or vibration, failure of the rotation of the spindle motor 196 at the start of the operation of the apparatus due to absorption of the disk surface 105 to the surface of the head 101, and so forth.

Fall-off of the head 101 from the head standby region 121 during shipment or stop of the apparatus can be prevented by setting the fixing force of the carriage fixing mechanism to a greater force than the force which moves the carriage due to external impact or vibration.

Figure 14:
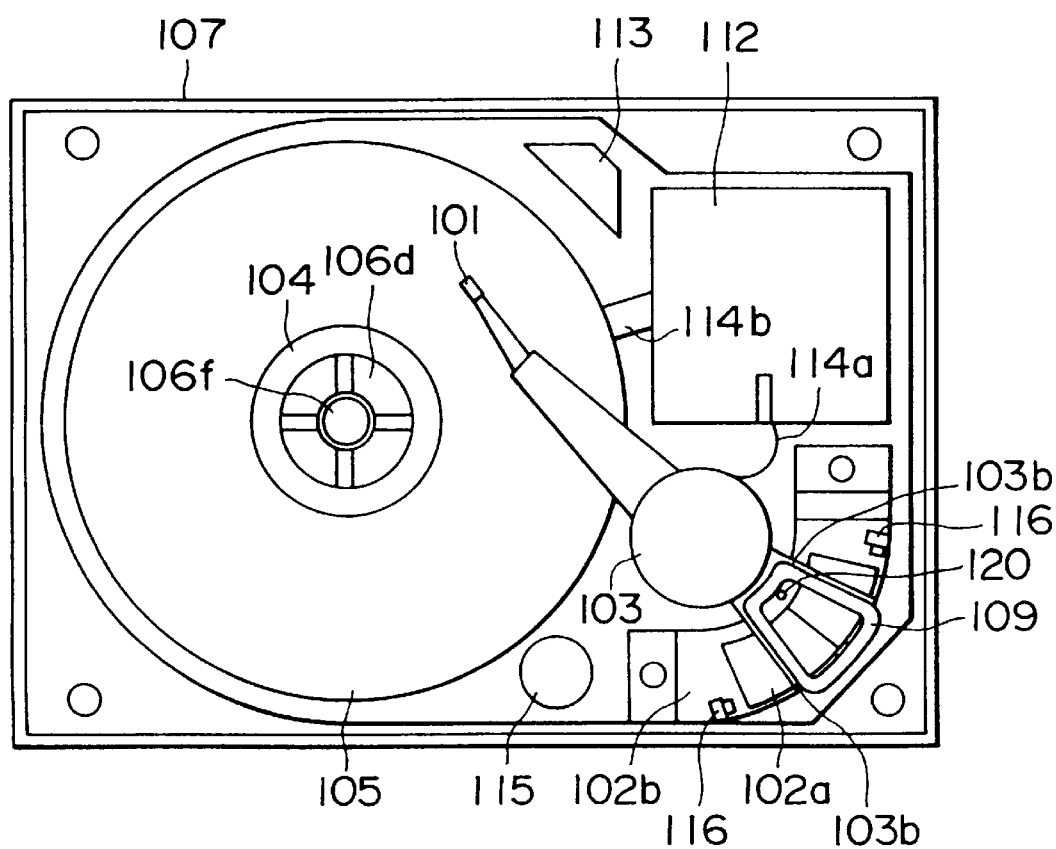
FIG. 14 is a top view when the cover is open in another embodiment of the present invention.
Figure 15:
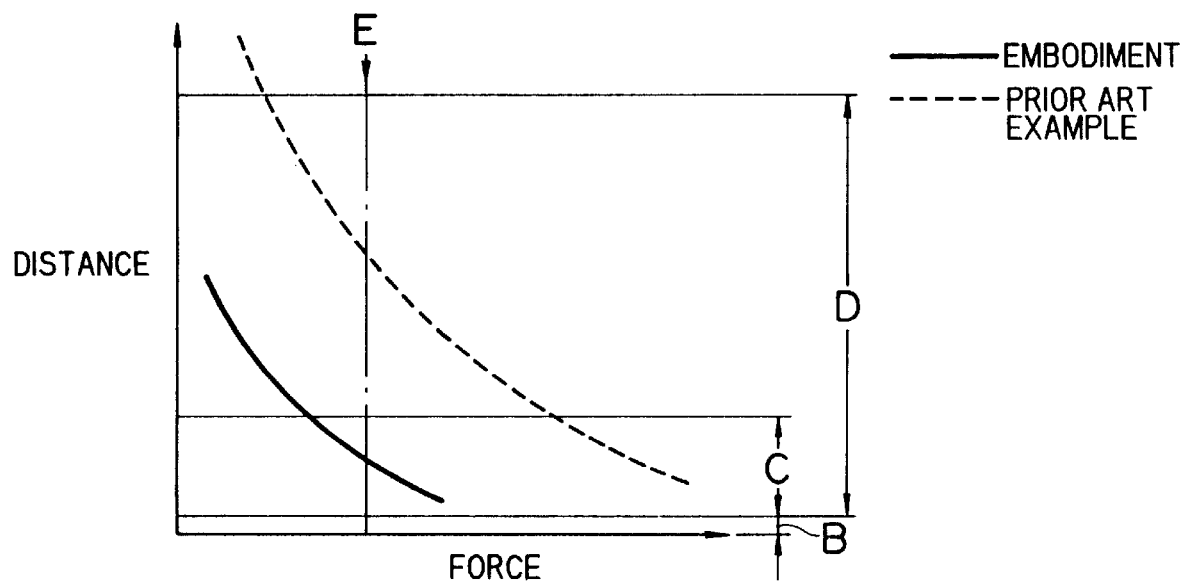
FIG. 15 is a graph showing the relationship between the distance of a magnetic member and a force that attracts the magnetic member.

The carriage fixing mechanism includes a magnetic member 120 disposed at a portion rotating with the carriage 103 as shown in FIG. 14. The position of disposition of the magnetic member 120 is a part of the carriage 103 near the central portion of the magnet 102a on which a leaking magnetic flux of the magnet 102a concentrates when the head 101 exists in the head standby region 121. FIG. 15 is a graph showing the relationship between the distance of the magnetic member 120 from the central portion of the magnet 102a on which the leaking magnetic flux of the magnet 102a most greatly concentrates and the force which attracts the magnetic member 120. In FIG. 14, on the other hand, the magnetic member 120 is shown bonded to the side surface of the hollow portion of the coil 109. The magnetic member 120 is interposed and bonded between a coil holding portion 103b of the carriage 103 and the coil 109. Alternatively, it may be buried, or bonded, into the coil holding portion 103b of the carriage 103. The magnet 102a need not have such a large leaking magnetic flux as to attract the magnetic member 120 even when the head 101 exists at the outermost circumferential position on the disk surface 105. The head yaw angle 101b is set so that which it disappears within the range of the positions of the head 101 on the disk surface 105 where the magnetic member 120 can be attracted by the magnet 102a. When the number of revolutions of the spindle motor 106 decreases and the floating height of the head 101 lowers at the stop of the apparatus, the head 101 comes into contact with the disk surface 105. At this time, the head 101 moves to a position near the head standby region 121 on the disk surface 105 within such a range where the magnetic member 120 can be attracted by the leaking magnetic flux of the magnet 102a, due to the frictional resistance with the side surface 101d of the rail 101a on the disk surface, that is, to the position at which the head yaw angle 101b disappears. Next, as the magnetic member 120 of the carriage 103 is attracted by the leaking magnetic flux of the magnet 102a, the head 101 existing near the head standby region 121 is fixed to the head standby position 121. To insure fixing of the head 101 to the head standby region 121, the operation till fixing of the head 101 to the head standby position 121 must be carried out during the inertial rotation of the spindle motor 106 in which the force for moving the head 101 may be small. The conversion value of the moment of inertia of the carriage 103, which is the load for moving the carriage 103, to the position of the head 101 must be reduced as much as possible so as to reduce the rotational load of the carriage 103. The movement of the carriage 103 for moving the head 101 to the head standby region 121 at the stop of the apparatus does not depend on the reaction of the FPC. Therefore, the FPC (CARRIAGE) (flexible printed board) 114a (FIG. 11) fixed to the side surface of the carriage 103 employs a thin type, and fixation to the side surface of the carriage 103 is made in such a manner as to acquire a greater curvature as much as possible. In this way, rigidity is reduced as much as possible and the reaction of the FPC is reduced.

When the head 101 comes into contact with the disk surface 105 moves to a position near the head standby region 121 on the disk surface 105 within such a range where the magnetic member 120 can be attracted by the leaking magnetic flux of the magnet 102a, due to the frictional resistance with the side surface 101d of the rail 101a on the disk surface 105. The moving distance of the carriage 103 due to the force of the leaking magnetic flux when the head 101 moves to the head standby region 121 is shown in FIG. 15, where B is the distance when magnetic member 120 is disposed most closely to the leaking magnetic flux concentration portion of the magnet 102a, C is the range of the distance employed in this embodiment, D is the range of the distance employed in the prior art example, and E is the minimum necessary force for fixing the carriage 103. Since the moving force does not so much depend on the force of the leaking magnetic flux as in the prior art, the force for moving the carriage 103 is increased by reducing the leaking magnetic flux of the magnet 102a and the load of the magnetic member 120 is reduced as represented by the curve (solid line) of the example in FIG. 15. As described above, the head 101 can be moved and fixed to the head standby region 121 on the disk surface during the inertial rotation of the spindle motor 106 at the time of the stop of the apparatus while the rotational load of the carriage 103 during its operation, the reaction of the FPC and the load of the magnetic member 120 are reduced to minimum, without adding a new component or components. The head 101 is fixed to the head standby region 121 during the shipment or stop of the apparatus. Therefore, it becomes possible to prevent the troubles such as the damage of the information recorded on the disk surface by the head 101 due to the external impact or vibration, unability of the rotation of the spindle motor 106 due to adsorption of the disk surface having high surface accuracy to the surface of the head 101 at the start of the apparatus, and so forth. When the force of attraction of the leaking magnetic flux to the magnet 102a is set to a force greater than the force that moves the carriage by the external impact or vibration, it becomes possible to prevent the head 101 from falling off from the head standby region 121 during shipment of stop of the apparatus. If the rotating portion of the carriage 103, inclusive of the head 101, the coil 109 and the FPC (CARRIAGE) (flexible printed board) 114a, is set as closely as possible to the center of rotation 103a of the carriage (FIG. 11) (for balancing), it becomes difficult for the carriage 103 to move even when it receives the external impact or vibration. Accordingly, even when the attraction force to the magnetic member 120 is reduced by further reducing the leaking magnetic flux of the magnet 102a, fall-off of the head 101 from the head standby region 121 can be prevented.

Figure 16:
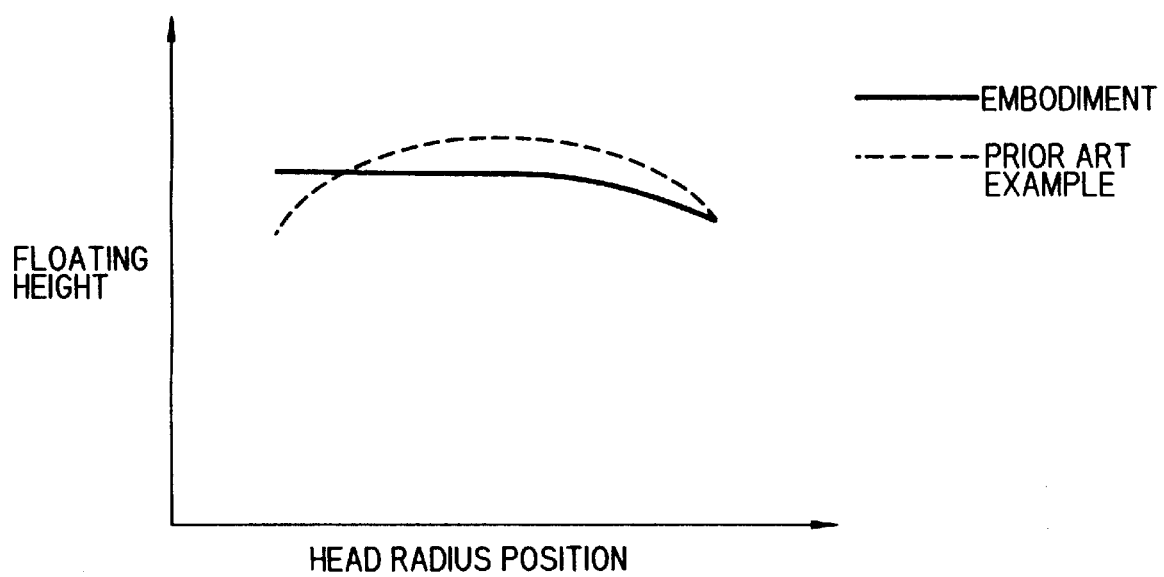
FIG. 16 is a graph showing the relationship between a floating height of a head and a head position radius.
Figure 17:
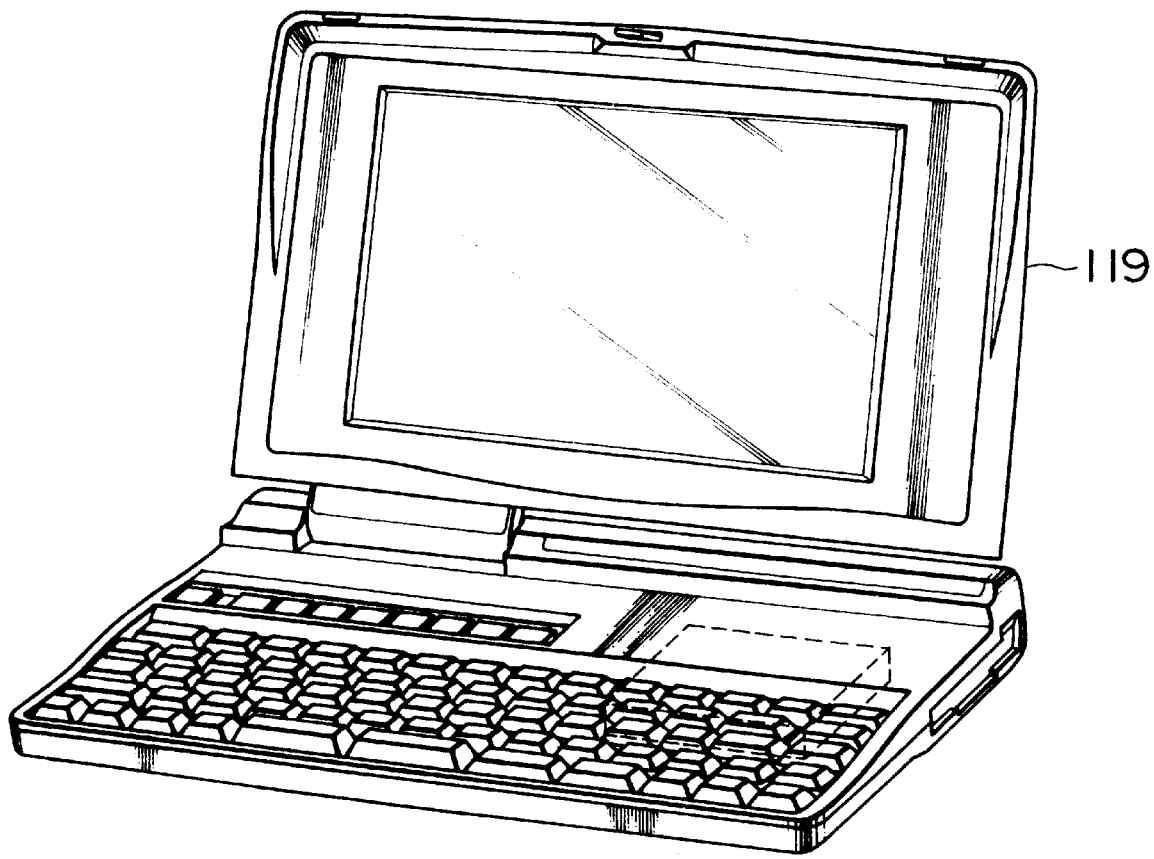
FIG. 17 is a schematic view showing appearance of a notebook type personal computer.

Also, the head yaw angle 101b must be set so that a uniform floating height can be obtained throughout all the positions on the disk surface 105. According to the prior art apparatuses, the relationship between the floating height of the head 101 and the distance from the center of rotation 122 of the disk (the head radius position) is such that a floating fluctuation width from the highest position to the lowest position has been from about 30 to about 35% with the highest floating position being 100%, as shown in FIG. 16. In contrast, this embodiment employs the negative pressure type head 101 which utilizes the negative pressure so as to improve floating stability and which is equipped with the three rails 101a as shown in FIG. 13. When the head yaw angle 101b is set in such a fashion that the head 101 attains the smallest angle at the innermost circumferential position of the disk 105 within the moving range of the head 101 on the disk surface 105, the floating fluctuation width can be lowered to about 25% as shown in FIG. 16. In consequence, a floating height which is as uniform as possible can be obtained at all the positions on the disk surface 105.

As described above, it has been necessary in the past to quickly move the carriage 103 so as to improve the information processing speed. However, due to the requirement for the smaller size and the smaller thickness for the voice coil 102, a sufficient packaging space of the voice coil 102 cannot be secured. From the aspect of lower power consumption, too, a large current cannot be caused to flow through the coil 109 fixed to the carriage 103. Magnets having a high flux density have been already used for the magnet 102a. The magnetic member must be attracted to the leaking magnetic flux even when the head 101 exists at the outermost circumferential position on the disk surface 105. Therefore, a large current is necessary for the coil 109 to such an extent that the load of the magnetic member can be neglected. However, a greater magnetic flux is not much preferable so as to efficiently combine the magnetic flux of the magnet 102a with the force for moving the carriage 103. The greater the distance from the center of rotation 103a of the carriage 103a to the generation point of the force of the coil 109, the smaller becomes the force of the coil 109, but there is a limit to this distance due to the limited space. Further, a great current is necessary for the coil 109 so that the reaction of the FPC cannot be neglected. For these reasons, the reduction of the size and thickness, lower power consumption and the improvement in the information processing speed have been limited in the conventional apparatuses. In contrast, since the movement of the carriage 103 for moving the head 101 to the head standby region 121 does not depend on the reaction of the FPC in this embodiment. This embodiment uses a thin type for the FPC (CARRIAGE) (flexible printed board) 114a fixed to the side surface of the carriage 103 (FIG. 11), and fixation to the side surface of the carriage 103 is effected in such a manner that curvature becomes as great as possible and rigidity becomes as low as possible to reduce the reaction of the FPC. Accordingly, power consumption can be achieved by reducing power to the coil 109. Another advantage is that when power is supplied to the coil 109 in the same quantity as in the prior art apparatus, on the contrary, the information processing speed of the apparatus can be improved. Further, the head 101 can be moved and fixed to the head standby region 121 on the disk surface during the inertial rotation of the spindle 106 at the time of the stop of the apparatus without adding a new component or components. Accordingly, the reduction of the size and thickness of the apparatus and its cost of production can be accomplished.

When the apparatus stops, the number of revolutions of the spindle motor 106 decreases and the floating height of the head 101 lowers, so that the head 101 comes into contact with the disk surface 105. Means for moving the head 101 to the head standby region 121 according to the prior art takes the frictional force between the head 101 and the disk 105 at this time into consideration, and the attraction force of the magnetic member by the magnet 102a must be set while taking this frictional force into consideration. When the head 101 comes into contact with the disk surface 105, it is moved by the frictional resistance with the side surface 101d of the rail 101a on the disk surface 105 to a position near the head standby region 121 on the disk surface 105 within the range in which the magnetic member 120 can be attracted by the leaking magnetic flux of the magnet 102a. Therefore, since the moving distance for moving the head 101 to the head standby region 121 does not depend so much on the force of the leaking magnetic flux as in the prior art apparatuses, the force for moving the carriage 103 can be increased by reducing the leaking magnetic flux of the magnet 120a and the load of the magnetic member 120 can be reduced. Therefore, it is possible to obtain the advantage that lower power consumption of the apparatus can be accomplished by reducing the load of the magnetic member 120 to a minimum and by reducing the power quantity to the coil 109. Another advantage is that the information processing speed of the apparatus can be improved by supplying power in the same quantity as in the prior art to the coil 109, on the contrary. When the apparatus stops, the head 101 can be moved and fixed to the head standby region 121 on the disk surface 105 during the inertial rotation of the spindle motor 106. Therefore, still another advantage is that the size, the thickness and the cost of the apparatus can be reduced.

The head 101 is fixed to the head standby region 121 during shipment or stop of the apparatus. Therefore, it is possible to prevent the damage of the information recorded on the disk surface 105 by the head 101 due to the external impact or vibration and unability of rotation of the spindle motor 106 at the start of the apparatus due to adsorption of the surface of the head 101 to the disk surface 105 which occurs at the stop of the apparatus. Therefore, reliability of the apparatus can be improved.

The gravitational center of the rotating portion of the carriage 103, inclusive of the head 101, the coil 109 and the FPC (CARRIAGE) (flexible printed board) 114a, is set as close as possible to the center of rotation 103a of the carriage (FIG. 11) (for balancing). In consequence, even when the carriage 103 receives any external impact or vibration, the carriage 103 does not move so easily. Even when the leaking magnetic flux of the magnet 102a is further reduced and the attraction force of the magnetic member 120 is reduced, fall-off of the head 101 from the head standby region 121 can be prevented. Therefore, reliability of the apparatus can be improved. Another advantage is that lower power consumption of the apparatus can be accomplished by reducing power to the coil 109. On the contrary, when power is supplied to the coil 109 in the same quantity as in the prior art apparatuses, the information processing speed of the apparatus can be improved.

The floating fluctuation with the conventional head 101 has been from about 30 to about 35%. In contrast, when the negative pressure type head 101 equipped with the three rails 101a is used as shown in FIG. 13 and when the head yaw angle 101b is set in such a manner as to attain the minimum angle at the innermost circumferential position of the disk within the moving range of the head 101 on the disk surface 105, the floating fluctuation width can be reduced to about 25% as shown in FIG. 16. Since the floating height which is as uniform as possible can be obtained at all the positions on the disk surface 105, a higher recording density can be accomplished for the apparatus.

As described above, this embodiment provides an apparatus which can accomplish the reduction of the size and thickness of the apparatus, higher recording density, higher reliability, lower power consumption and higher information processing speed, and can move and fix the head 101 to the head standby region 121 at the time of shipment or at the stop of operation of the apparatus.

We claim:

1. A magnetic disk apparatus having a magnetic disk medium, comprising:

a dual head for reading or writing information from or to said magnetic disk medium, having at least one gap for effecting magnetic recording and at least one gap for effecting magnetic reproduction set on a slider;

a spindle motor for supporting and rotating said magnetic disk medium;

a head assembly including said dual head, said slider and a support member for supporting said slider;

a carriage arm including a pivot shaft for supporting and moving said head assembly across said magnetic disk medium;

a voice coil motor for driving said carriage arm;

an electronic circuit for causing said magnetic head to read and write information from and to said magnetic disk medium; and a controller for controlling the operations of said electronic circuit, said spindle motor and said voice coil motor, wherein said magnetic disk medium has at least one ID information in one unit of information storage in addition to servo information for controlling positioning of said head assembly in one of said plurality of tracks, and wherein said tracks have unequal track pitches, of which a change rate in rotational angle of said carriage arm is not greater than 7% between two adjacent tracks of unequal track pitch.

2. A magnetic disk apparatus having a magnetic disk medium, comprising:

a dual head for reading or writing information from or to said magnetic disk medium, having at least one inductive head for effecting magnetic recording and at least one magneto-resistive (MR) head for effecting magnetic reproduction set on a slider;

a spindle motor for supporting and rotating said magnetic disk medium;

a head assembly including said dual head, said slider and a support member for supporting said slider;

a carriage arm including a pivot shaft for supporting and moving said head assembly across said magnetic disk medium;

a voice coil motor for driving said carriage arm;

an electronic circuit for causing said magnetic head to read and write information from and to said magnetic disk medium; and a controller for controlling the operations of said electronic circuit, said spindle motor and said voice coil motor, wherein a write radius position of an ID portion is set to an intermediate point between a positioning radius position of said MR head when said MR head reads out data and a positioning radius position of said MR head when said inductive head writes data, and wherein said magnetic disk medium has at least one ID information in one unit of information storage in addition to servo information for controlling positioning of said head assembly in one of said plurality of tracks, and wherein said tracks have unequal track pitches, of which a change rate in rotational angle of said carriage arm is not greater than 7% between two adjacent tracks of unequal track pitch.

3. A magnetic disk apparatus having a magnetic disk medium, comprising:

a dual head for reading or writing information from or to said magnetic disk medium, having at least one gap for effecting magnetic recording and at least one gap for effecting magnetic reproduction set on a slider;

a spindle motor for supporting and rotating said magnetic disk medium;

a head assembly including said dual head, said slider and a support member for supporting said slider;

a carriage arm including a pivot shaft for supporting and moving said head assembly across said magnetic disk medium;

a voice coil motor for driving said carriage arm;

an electronic circuit for causing said magnetic head to read and write information from and to said magnetic disk medium; and a controller for controlling the operations of said electronic circuit, said spindle motor and said voice coil motor, wherein said magnetic disk medium has at least one ID information in one unit of information storage in addition to servo information for controlling positioning of said head assembly in one of said plurality of tracks, and wherein said tracks have unequal track pitches, of which a change rate between adjacent tracks of unequal track pitches is not greater than 7%.

4. A magnetic disk apparatus according to claim 3, wherein said dual head includes a read-only MR head and a write-only inductive head, and wherein a core width of said MR head is smaller than that of said inductive head.

5. A magnetic disk apparatus according to claim 3, wherein said dual head includes a read-only MR head and a write-only inductive head, and a gap center of said MR head and a gap center of said inductive head in said dual head are shifted from each other in the direction along their gaps.

6. A magnetic disk apparatus according to claim 3, wherein said track pitches change under a combination of three rates of change of the track pitch.

7. A magnetic disk apparatus having a magnetic disk medium, comprising:

a dual head for reading or writing information from or to said magnetic disk medium, having at least one inductive head for effecting magnetic recording and at least one magneto-resistive (MR) head for effecting magnetic reproduction set on a slider;

a spindle motor for supporting and rotating said magnetic disk medium;

a head assembly including said dual head, said slider and a support member for supporting said slider;

a carriage arm including a pivot shaft for supporting and moving said head assembly across said magnetic disk medium;

a voice coil motor for driving said carriage arm;

an electronic circuit for causing said magnetic head to read and write information from and to said magnetic disk medium; and a controller for controlling the operations of said electronic circuit, said spindle motor and said voice coil motor, wherein a write radius position of an ID portion is set to an intermediate point between a positioning radius position of said MR head when said MR head reads out data and a positioning radius position of said MR head when said inductive head writes data, and wherein said magnetic disk medium has at least one ID information in one unit of information storage in addition to servo information for controlling positioning of said head assembly in one of said plurality of tracks, and wherein said tracks have unequal track pitches, of which a change rate between adjacent tracks of unequal track pitches is not greater than 7%.

8. A magnetic disk apparatus according to claim 7, wherein said track pitches change under a combination of three rates of change of the track pitch.

9. A magnetic disk apparatus according to claim 7, wherein a core width of said MR head is smaller than that of said inductive head.

10. A magnetic disk apparatus according to claim 7, wherein a gap center of said MR head and a gap center of said inductive head in said dual head are shifted from each other in the direction along their gaps.

* * * * *